United States Patent
Ushakov

(10) Patent No.: US 9,812,116 B2
(45) Date of Patent: *Nov. 7, 2017

(54) NECK-WEARABLE COMMUNICATION DEVICE WITH MICROPHONE ARRAY

(71) Applicant: Alexey Leonidovich Ushakov, Moscow (RU)

(72) Inventor: Alexey Leonidovich Ushakov, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,593

(22) Filed: Aug. 23, 2016

(65) Prior Publication Data

US 2016/0381453 A1    Dec. 29, 2016

Related U.S. Application Data

(63) Continuation-in-part of application No. 15/052,240, filed on Feb. 24, 2016, now Pat. No. 9,621,978, which is a continuation of application No. 13/902,903, filed on May 27, 2013, now Pat. No. 9,282,392.

(51) Int. Cl.
| | |
|---|---|
| *H04R 1/10* | (2006.01) |
| *G10K 11/178* | (2006.01) |
| *H04M 1/05* | (2006.01) |
| *H04M 1/15* | (2006.01) |
| *H04M 1/60* | (2006.01) |

(52) U.S. Cl.
CPC ........... *G10K 11/1786* (2013.01); *H04M 1/05* (2013.01); *H04M 1/15* (2013.01); *H04R 1/1033* (2013.01); *H04R 1/1066* (2013.01); *G10K 2210/3044* (2013.01); *G10K 2210/3046* (2013.01); *H04M 1/6058* (2013.01); *H04R 1/1016* (2013.01); *H04R 1/1041* (2013.01); *H04R 1/1083* (2013.01); *H04R 2201/023* (2013.01); *H04R 2410/05* (2013.01); *H04R 2420/07* (2013.01)

(58) Field of Classification Search
CPC ................ H04R 1/1033; H04R 1/1066; H04R 2410/05; H04R 1/1083; H04R 1/1041; H04R 1/1016; H04R 2420/07; H04R 2201/023; G10K 11/1786; G10K 2210/3044; G10K 2210/3046; H04M 1/05; H04M 1/6058; H04M 1/15
See application file for complete search history.

(56) References Cited

U.S. PATENT DOCUMENTS

| | | | | |
|---|---|---|---|---|
| 2007/0277995 | A1* | 12/2007 | Sakai | ........................ H01B 7/40 174/113 R |
| 2011/0216931 | A1* | 9/2011 | Bui | ........................ H04R 1/1091 381/333 |

* cited by examiner

*Primary Examiner* — Muhammad N Edun
(74) *Attorney, Agent, or Firm* — Bardmesser Law Group

(57) ABSTRACT

A wearable electronic device includes a neck-wearable housing, generally U-shaped, with an electrical connector; two in-ear earphones; two cords, with one end connected to one of the earphones and the other end connected to the connector. The two cords are mechanically connected to the housing. Points of connection of the cords to the housing are close to each other and form a dorsal node, and the two cords are mechanically connected to each other in their portions between the in-ear earphones and the dorsal node to form a suboccipital node. A microphone is placed in the housing on a front (chest) side of the user. A microphone is placed in the dorsal and/or in the suboccipital node. The microphones are used for determination of correlated and non-correlated components of audio signals. The correlated components are treated as a noise signal and the non-correlated components are a target signal.

43 Claims, 29 Drawing Sheets

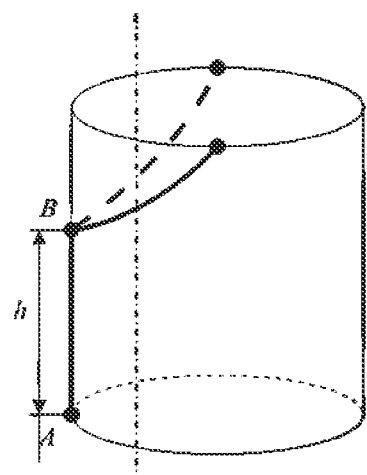
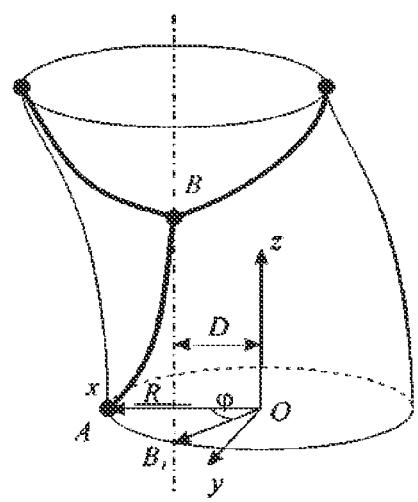
FIG. 2A
FIG. 2B
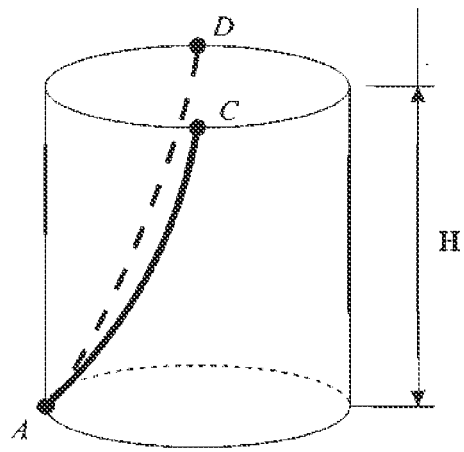
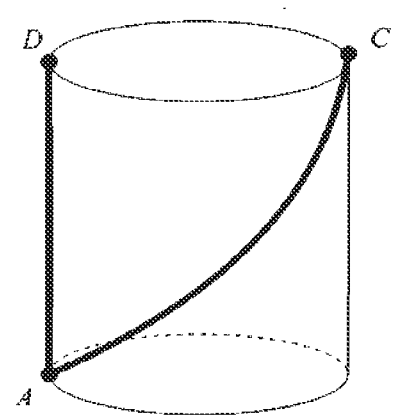
FIG. 3A
FIG. 3B

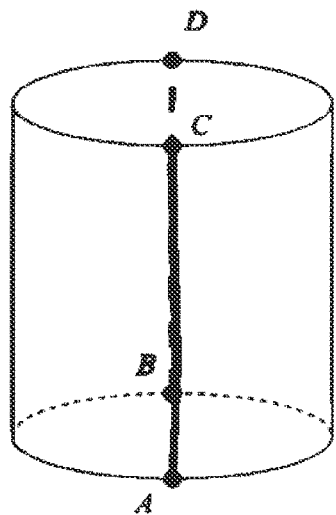
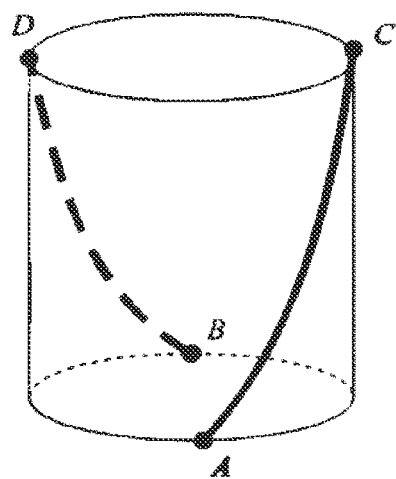
FIG. 4A  FIG. 4B
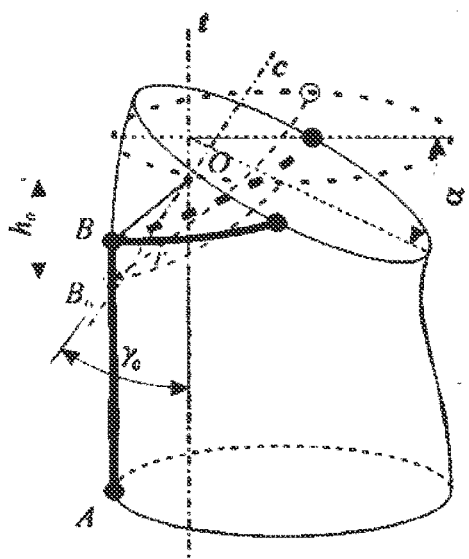
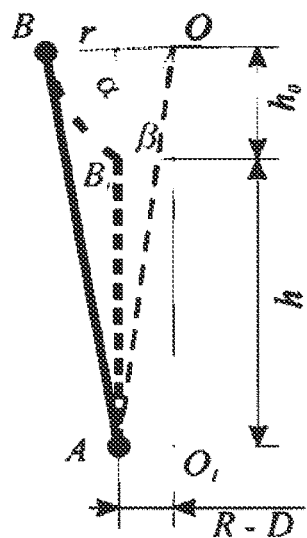
FIG. 5A  FIG. 5B

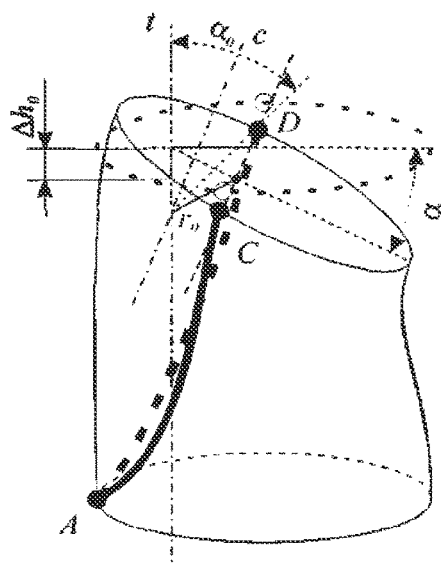
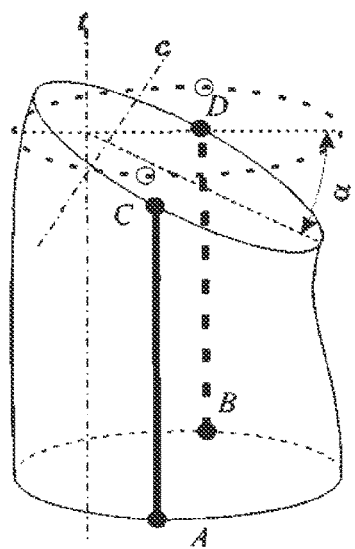
FIG. 6A          FIG. 6B
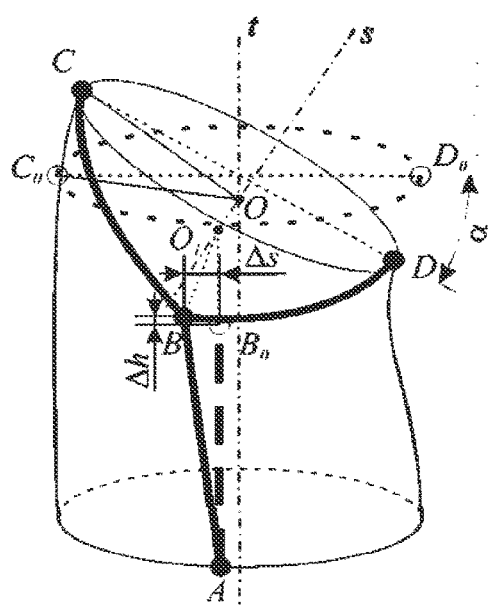
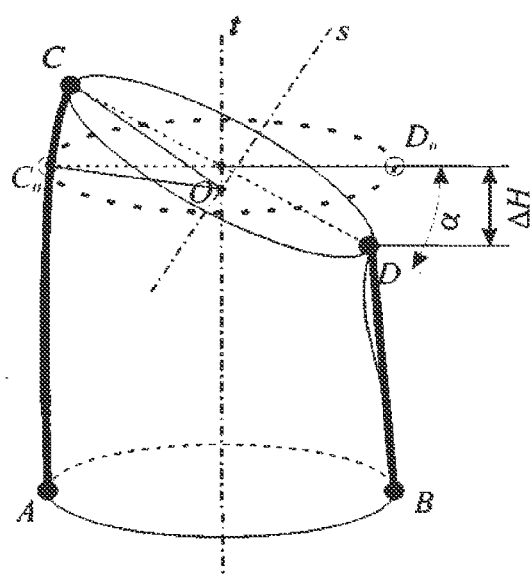
FIG. 7A          FIG. 7B

NECK-WEARABLE COMMUNICATION DEVICE WITH MICROPHONE ARRAY

CROSS-REFERENCE TO RELATED APPLICATIONS

This application is a continuation in part of U.S. patent application Ser. No. 15/052,240, filed on Feb. 24, 2016, which is a continuation of U.S. patent application Ser. No. 13/902,903, filed on May 27, 2013, which claims priority to Russian Patent Application No. 2012158157, filed on Dec. 28, 2012, all of which are incorporated herein by reference in their entirety.

BACKGROUND OF THE INVENTION

Field of the Invention

The invention relates to telecommunication devices, and, more particularly, to a neck-wearable telecommunication device.

Description of the Related Art

Wearable telecommunication devices based on a necklace, collar, neckband, headband or other similar load-carrying structure are often used as an interface between a human being and a technical system, which may be a telecommunication system, a computer system, an entertainment system, a medical system, a security system, etc.

Known stereo headsets in the form of a necklace, collar, neckband, either a neck half-loop or a neck loop type, have predominantly two types of connection between earphones and the neck part: headsets with two side nodes, in which earphone cords are connected with the neck part and do not have connections between themselves, and headsets with a single node, in which earphone cords are connected to each other and to the neck loop in a single node.

A conventional headset (see U.S. Pat. No. 7,416,099B2) includes earphones connected through cords to a supporting structure, which accommodates a signal transceiver, and is connected to a necklace (neck loop). The headset comprises long unsecured portions of cords connecting the earphones to the neck loop, because the additional length is needed when the user rotates and moves the head relative to the torso. The headset has two nodes and the length of the movable portion of the cords in the headset is more than 19 cm. The cords hang freely along the entire length thereof in the air over the user's body surface, so they have slack and might tangle and cling to surrounding objects. In addition, the headset is difficult to wear under clothing, both in the operational and non-operational position, i.e., when the earphones are taken off the ears.

A known earphone storage structure (U.S. Pat. No. 7,936,895B2) includes a necklace (similar to a neck loop), two fasteners formed in the two ends of the necklace, and stoppers. The size of the fasteners is smaller than the size of the stoppers and the size of the earphones, therefore the earphones may be pulled out when they are not used. The stoppers connection form nodes, and this device relates to headsets with two side nodes. The earphone storage structure has the same limitations as the previous device: cords have slack, and the structure is difficult to wear under clothing, and managing it through clothing is not convenient.

A lanyard for a portable electronic device (U.S. Pat. No. 7,650,007B2) includes two side connection nodes and allows adjusting the length of earphone cords, but the lanyard does not eliminate sagging of cords in the operational position.

In a necklace-type audio device (WO 2012015257A1), earphone cords form a neck loop when they are attached at their ends to a jack disposed on the user's chest, and crossed through two rings disposed in the back of the necklace (neck loop), the rings being adapted to adjust the length of the neck loop and earphone cords. In this device, the length of the cords connecting the earphone to the necklace (neck loop) is even longer than in necklace-type headsets with two side nodes; this contributes to slacking the cords, and the way of adjusting the length of cords in the headset eliminates a possibility of wearing the device under clothes.

A known modular personal audio device (WO 2005022872A1) and (US 20070021073A1) includes a necklace having a winding device for headphone cords. These cords are connected to the rear part of the necklace and may be coiled when the headphones are in the non-operational position. However when the cords are in the operational position, they are still loose and so remain movable, and freely hang over the user's head during rotation of the head. Hook-type holders are provided for securing the headphones to the auricle. This makes wearing the device noticeable and inconvenient. The device does not have any controls means.

A known headset (US 20020043545A1) includes a headphone and a microphone, the headset provided in the form of a wire loop bearing the device connected to the headset. This makes wearing the headset noticeable and inconvenient. The device does not have any controls means.

A known headset (US 2002065115A1) which includes one or two headphones and one or two microphones, the headset provided in the form of a wire loop bearing the device connected to the headset. The headphones are connected to the device by separate cords. This makes wearing the headset noticeable and inconvenient. The device does not have any controls means.

A known loop (US 20070080186A1) for retaining an electronic device, has cords are located inside the loop, and the user is able to change the point where the cord leaves the loop and to adjust the length of the loose part of the cord by moving a clip. However, this makes wearing the headphones noticeable and inconvenient during rotation of the head.

A known wire loop (US 20070053523A1) for retaining an electronic device, wherein the user is able to adjust the length of the loose part of the cords by moving a clip. However, this makes wearing the headphones noticeable and inconvenient.

A known headset (US 2008143954A1), (US 20110051982A1) is in the form of spectacles comprising headphones to be secured on the spectacle frame when the headphones are in a non-operational position and connected by separate cords to an electronic unit located on the user's occiput. The headset has a considerable weight and the electronic unit observably extends from the user's head surface. This makes wearing the headset noticeable and inconvenient.

A known headset (US 2008283651A1) includes a loop for bearing the headset on the user's neck, headphones and a device for retracting and coiling the cord extending from the headset to an external electronic device which may be placed in a pocket or fastened to a belt, etc. This makes wearing the headphone noticeable and inconvenient. The device does not have any controls means.

A known modular personal audio device (US 2009318198A1) includes headphones connected by separate cords to an electronic unit comprising a power source and located on the user's neck's back side. The separate cords are disposed at the level of lower part of user's auricles, so this makes wearing the device noticeable and inconvenient.

A known wire loop (WO 2003103255A1) for bearing an electronic device, wherein the user is able to adjust the length of the loose part of the headphone cords by moving a clip, and magnets are used to retain the headphones in the non-operational position. However when the user changes length of the headphone cords, size of the neck loop changes correspondingly, and the cords comprise loose parts. All this makes wearing the headphone noticeable and inconvenient.

A known audio player (WO 2009019517A2) aggregated with a rigid headband, wherein an electronic device and control means are disposed in a rear part of the headband located on the back surface of the user's neck. A rigid configuration of the player makes its wearing noticeable and control turns out to be inconvenient.

A known headset (WO 2010019634A2) includes an open rigid loop having a microphone located at one end thereof and headphones connected to the loop by separate cords. A loose part of the cord makes wearing the headphone noticeable and inconvenient. A rigid configuration of the loop is incompatible with certain types of clothes.

Therefore, the conventional devices, first, include excessively long unsecured portions of cords that connect the head part of a headset having a neck loop (in headsets with a single node the length of freely hanging cords is about 19 cm, and in headsets with two side nodes it is about 25 cm) and, second, unsecured portions of cords in the conventional devices do not fit to the body surface. The cord slack cannot be fully removed without restricting the freedom of movement of the user's head. Therefore, when the devices are used, the cords either slack, tangle and cling to surrounding objects, or restrict freedom of the user's movement.

Therefore, no device suitable for constant wearing has been designed up to now, which device would have a small total length of freely hanging cords snugly fitted to the body and creating no impediments to movements of the head. Such a device shall provide improved user experience by facilitating easy use, assuring secure fixation thereof on the user's body, and preventing failures caused by the cords clinging to surrounding objects.

In general, the degree of slack of cords depends on the following factors:
the length of movable portion of cords between fixed points. In all conventional neck headsets this is the length of the cord between an earphone and the neck loop, so the shorter the movable portion of the cord, the less the slack is;
cord tension;
degree of adherence of the cord to the body surface;
position of the cords; cords disposed on a plane do not slack as opposed to cords hanging in the air or lying above natural depressions on the surface of user's body.

It shall be noted that in the description of the invention herein, a wearable device or a part thereof may be put on the neck of a user and may look like an article of clothing, e.g., a scarf or a neckerchief, which can be put on and used in the form of an O-shaped neck loop or an U-shaped neck loop In order to concisely indicate a component designed and arranged to be worn around the neck, the following terms may be used: neck loop, neck set, neck strip, neck tape, neckerchief, neck strap, neck band, neckwear, neck-wearable housing, neck sheath, and so on.

The inventor has found by experimentation that the components disposed on the user's neck, shoulders and chest, being both in the form of a closed loop (such as an O-loop) and an open loop (or a half-loop, or a U-shape), equally allowed attaining the same technical result when the neck-worn part of components were properly located adjacent to the dorsal part of the user's neck. In this case, the dorsal and suboccipital nodes of the device are located in optimized positions according to the mathematical models described herein, which is essential for attaining advantageous effects of this invention.

But, from a usability point of view, the two types of neck loops may differ from each other. In particular, an O-shaped loop can hardly be put on and taken off without unfastening thereof. Moreover, this is technically difficult for a typical women-targeted device due to the smaller size of the device. Unfastening the device at the rear side, as it is usual for the most necklaces, is not convenient due to presence of the dorsal node disposed on the dorsal neck side, which is one feature of the invention.

The inventor would like to highlight a wearable device comprising an U-shaped neck-wearable housing as a separate option. This option allows easy put-on and take-off of the device and provides compact design thereof.

A wide range of wearable electronic devices appeared recently owing to development progress in radio engineering and computer engineering. However, the problem of noise reduction in speech signals became even more pressing as the wearable devices may be used in a very noisy environment.

The easiest way of noise reduction in a speech signal is placing a low sensitive microphone in a close vicinity of a user's mouth. But this causes certain usability problems as the microphone is clearly visible and a support structure has to be used in order to fix the microphone in an appropriate position.

Another way of noise reduction in a speech signal is using a dual-port microphone which may be positioned somewhat more distantly from the user's mouth, e.g., on the user's chest. A dual-port microphone facilitates noise cancellation owing to processing two speech signals taken from different directions. However, in order to assure effective noise cancellation by phase and volume processing, the distance between the user's mouth and the microphone ports has to be exactly known, which is impossible when the user tilts and/or rotates his/her head.

Moreover, the user possibly will have to bend his/her head towards the chest in order to maintain acceptable quality of the speech signal in a very noisy environment. According to scientific research, see [1], methods of digital processing a speech signal obtained from a single microphone yielded substantial distortion of the signal and unacceptable separation of speech and noise.

Still another way of noise reduction in a speech signal is digital processing multiple speech signals obtained from a number of microphones aggregated into a microphone array of a certain type. Extraction of a target signal from a signal/noise mixture may be performed using various algorithms based on different mathematical tools. According to scientific research, see [1], the optimal number of microphones in a microphone array was found to be in the range of three to five, as the less number of microphones ceased effectiveness of processing and the greater number of microphones did not contribute in considerably better results.

A noise-reducing directional microphone array is disclosed in WO 2007106399. The array comprises at least two microphones generating forward and backward cardioid signals from two omnidirectional microphone signals. An adaptation factor is applied to the backward cardioid signal, and the resulting adjusted backward cardioid signal is subtracted from the forward cardioid signal to generate a first-order output audio signal corresponding to a beam pattern having no nulls or negative values of the adaptation factor. After low-pass filtering, spatial noise suppression can be applied to the output audio signal. Microphone arrays having one or more additional microphones can be designed to generate second- or higher-order output audio signals.

A mobile telephone with multiple microphones is disclosed in US 2006147063. The telephone is equipped with multiple microphones which provide improved performance during operation of the telephone in a speaker-phone mode. These multiple microphones can be used to improve voice activity detection, which in turn, can improve echo cancellation. In addition, these multiple microphones can be configured as an adaptive microphone array and used to reduce the effects of room reverberation, when a near-end user is speaking, and/or acoustic echo, when a far-end user is speaking.

Eye glasses with a microphone array are known from US 2014278385. The publication discloses a method of reducing noise by forming a main signal and one or more reference signals at a beam-former based on at least two received audio signals, detecting voice activity at a voice activity detector, where the voice activity detector receives the main and reference signals and outputting a desired voice activity signal, adaptively canceling noise at an adaptive noise canceller, where the adaptive noise canceller receives the main, reference, and desired voice activity signals and outputs an adaptive noise cancellation signal, and reducing noise at a noise reducer receiving the desired voice activity and adaptive noise cancellation signals and outputting a desired speech signal.

A device and method for direction dependent spatial noise reduction is disclosed in WO 2011101045. The device includes a plurality of microphones for measuring an acoustic input signal from an acoustic source. The microphones form at least one monaural pair and at least one binaural pair. Directional signal processing circuitry is provided for obtaining, from the input signal, at least one monaural directional signal and at least one binaural directional signal. A target signal level estimator estimates a target signal level by combining at least one of the monaural directional signals and at least one of the binaural directional signals, which at least one monaural directional signal and at least one binaural directional signal mutually have a maximum response in a direction of the acoustic source. A noise signal level estimator estimates a noise signal level by combining at least one of the monaural directional signals and at least one of the binaural directional signals, which at least one monaural directional signal and at least one binaural directional signal mutually have a minimum sensitivity in the direction of the acoustic source.

A noise-reducing directional microphone array is disclosed in WO2014062152. The directional microphone array comprises at least two microphones mounted on opposite sides of a device and generates forward and backward base signals from two omnidirectional microphone signals using diffraction filters and equalization filters. Each diffraction filter implements a transfer function representing the response of an audio signal traveling from a corresponding microphone around the device to the other microphone. A scale factor is applied to, for example, the backward base signal, and the resulting scaled backward base signal is combined with (e.g., subtracted from) the forward base signal to generate a first-order differential audio signal. After low-pass filtering, spatial noise suppression can be applied to the first-order differential audio signal. Microphone arrays having one or more additional microphones can be designed to generate second- or higher-order differential audio signals.

An adaptive noise canceling arrangement, a noise reduction system and a transceiver are disclosed in WO 9723068. The cross-coupled adaptive noise canceling arrangement comprises an adaptive cross-talk filter which is split into a prefilter section and an adaptive filter section, the sections using different input signals. The prefilter section estimates the desired signal from the input signal of the noise canceling arrangement, and the adaptive filter section has its input coupled to the output of the noise canceling arrangement, a delay section being provided between the input and the output of the noise canceling arrangement. The prefilter section and the adaptive filter section are separate filters.

Microphone arrays with rear venting are disclosed in US 2009003640 and US 2012207322. Such a microphone array includes at least two physical microphones to receive acoustic signals. The physical microphones make use of a common rear vent (actual or virtual) that samples a common pressure source. The microphone array includes a physical directional microphone configuration and a virtual directional microphone configuration. By making the input to the rear vents of the microphones (actual or virtual) as similar as possible, the real-world filter to be modeled becomes much simpler to model using an adaptive filter.

An Audio signal processing device is disclosed in US 2015125011. The device includes frequency conversion units configured to generate a plurality of input audio spectra by performing frequency conversions on input audio signals input from a plurality of microphones provided in a housing, a first input selection unit configured to select input audio spectra corresponding to a first combination direction from among the input audio spectra based on an arrangement of the microphones for the housing, and a first combining unit configured to generate a combined audio spectrum having directivity of the first combination direction by calculating power spectra of the input audio spectra selected by the first input selection unit.

A directional hearing system is disclosed in WO 9740645. The system is constructed in a form of a necklace including an array of two or more microphones mounted on a housing supported on the chest of a user by a conducting loop encircling the user's neck. Signal processing electronics contained in the same housing receives and combines the microphone signals in such a manner as to provide an amplified output signal which emphasizes sounds of interest arriving in a direction forward of the user. The microphone output signals are weighted and combined to achieve desired spatial directivity responses. The weighting coefficients are determined by an optimization process. By bandpass filtering the weighted microphone signals with a set of filters covering the audio frequency range and summing the filtered signals, a receiving microphone array with a small aperture size is caused to have a directivity pattern that is essentially uniform over frequency in two or three dimensions.

A super directive microphone array is disclosed in WO 9746048. In the array, analog filters are used to band-limit at least two secondary microphone elements which are spaced from a primary microphone element by a distance respective of their band limited outputs. The band-limited secondary microphone signals are digitized by an analog-to-digital converter. A signal processor performs a super directive analysis of the primary microphone signal and the combined secondary microphone signals. A plurality of microphones may be arranged in a ring. Their outputs are digitized, split into frequency bands, and weighted sums are formed for each of a plurality of directions. A steering control circuit evaluates the relative energy of each directional signal in each band and selects a microphone direction for further processing and output.

A microphone array subset selection method for robust noise reduction is disclosed in WO 2011103488. The method includes selecting a plurality of fewer than all of the channels of a multichannel signal, based on information relating to the direction of arrival of at least one frequency component of the multichannel signal.

A microphone system for teleconferencing system is disclosed in WO 9510164. The system comprises at least two directional microphones, mixing circuitry, and control circuitry. The microphones are held each directed out from a center point. The mixing circuitry combines the electrical signals from the microphones in varying proportions to form a composite signal, the composite signal including contributions from at least two of the microphones. The control circuitry analyzes the electrical signals to determine an angular orientation of the acoustic signal relative to the central point, and substantially continuously adjusts the proportions in response to the determined orientation and provides the adjusted proportions to the mixing circuitry. The values of the proportions are selected so that the composite signal simulates a signal that would be generated by a single directional microphone pivoted about the central point to direct its maximum response at the acoustic signal as the acoustic signal moves about the environment.

A directional microphone is disclosed in WO 0239783. The microphone comprises a microphone array having a plurality of microphone elements of which one element is a rear element and the other elements are forward elements. A processor is connected to the elements. The processor can be a hardware processor for processing signals or it can be a software controlled system for processing signals. The processor determines the arrival of a wave at one of the forward elements and thereafter establishes a window of opportunity for receipt of the wave at the rear element.

The window of opportunity is set such that only waves emanating from a particular direction will arrive in that time frame, thereby enabling acoustic waves from that direction to be processed by the microphone and other waves from different directions eliminated. The angle of arc of the microphone from which acoustic waves are received and processed can be set by changing the size of the window of opportunity t3–t2. In the hardware implementation, the processor includes filters, zero cross-over detectors, monostables and a flip-flop for setting a timing signal and triggering the flip-flop to control the switch so that if a wave does arrive at the element within the bandwidth of the filters, an audio signal corresponding to the wave is transmitted from the element through the switch to an output.

A method of estimating weighting function of audio signals in a hearing aid is disclosed in US 2009202091. The method includes estimating a weighting function of received audio signals, the hearing aid is adapted to be worn by a user; the method comprises the steps of: estimating a directional signal by estimating a weighted sum of two or more microphone signals from two or more microphones, where a first microphone of the two or more microphones is a front microphone, and where a second microphone of the two or more microphones is a rear microphone; estimating a direction-dependent time-frequency gain, and synthesizing an output signal; wherein estimating the direction-dependent time-frequency gain comprises: obtaining at least two directional signals each containing a time-frequency representation of a target signal and a noise signal; and where a first of the directional signals is defined as a front aiming signal, and where a second of the directional signals is defined as a rear aiming signal; using the time-frequency representation of the target signal and the noise signal to estimate a time-frequency mask; and using the estimated time-frequency mask to estimate the direction-dependent time-frequency gain.

Systems and methods of detecting a user's voice activity using an accelerometer are disclosed in WO 2014051969 and US 2014270231. The methods start with a voice activity detector (VAD) generating a VAD output based on (i) acoustic signals received from microphones included in the mobile device and (ii) data output by an inertial sensor that is included in an earphone portion of the mobile device. The inertial sensor may detect vibration of the user's vocal chords modulated by the user's vocal tract based on vibrations in bones and tissue of the user's head. A noise suppressor may then receive the acoustic signals from the microphones and the VAD output and suppress the noise included in the acoustic signals received from the microphones based on the VAD output. The method may also include steering one or more beamformers based on the VAD output.

A three-dimensional sound compression and over-the-air-transmission method during a call is disclosed in WO 2013176959. A wireless communication device records a plurality of directional audio signals. The wireless communication device also generates a plurality of audio signal packets based on the plurality of directional audio signals. At least one of the audio signal packets includes an averaged signal. The wireless communication device further transmits the plurality of audio signal packets.

A headset and a method for audio signal processing is disclosed in EP2884763. The headset comprises a first pair of microphones outputting a first pair of microphone signals and a second pair of microphones outputting a second pair of microphone signals; a first near-field beamformer and a second near-field beamformer each configured to receive a pair of microphone signals and adapt the spatial sensitivity of a respective pair of microphones as measured in a respective beamformed signal output from a respective beamformer, wherein the spatial sensitivity is adapted to suppress noise relative to a desired signal; a third beamformer configured to dynamically combine the signals output from the first beamformer and the second beamformer into a combined signal, wherein the signals are combined such that signal energy in the combined signal is minimized while a desired signal is preserved; and a noise reduction unit configured to process the combined signal from the third beamformer and output the combined signal such that noise is reduced.

A method for three-dimensional sound capturing and reproducing with multi-microphones is disclosed in WO 2012061151. The method of orientation-sensitive recording control includes indicating, within a portable device and at a first time, that the portable device has a first orientation relative to a gravitational axis and, based on the indication, selecting a first pair among at least three microphone channels of the portable device. This method also includes indicating, within the portable device and at a second time that is different than the first time, that the portable device has a second orientation relative to the gravitational axis that is different than the first orientation and, based on the indication, selecting a second pair among the at least three microphone channels that is different than the first pair. In this method, each of the at least three microphone channels is based on a signal produced by a corresponding one of at least three microphones of the portable device.

A Bluetooth microphone array is disclosed in U.S. Pat. No. 8,295,771. Signal processing resources of a wireless telephone and multi-channel transmission capabilities of the Bluetooth transmission are used to suppress the background noise. The wireless telephone system includes a Bluetooth transceiver communicating to a wireless telephone through a multi-channel Bluetooth transmission, and an array of microphones coupled to the Bluetooth transceiver. The array of microphones includes a first microphone producing a first audio signal output and a second microphone producing a second audio signal output. The first audio signal output and second audio signal output are transmitted to the wireless telephone through the first channel and second channel of multi-channel Bluetooth transmission respectively. The system and method of the invention allow using low cost Bluetooth transceiver(s) with multiple microphone arrays to provide the background noise suppression. There are numerous other known devices and methods in the art. The following references are exemplary: WO 2012061151; CN 202998463; US 2012020485; US 2015245129; US 2012087510; U.S. Pat. No. 6,594,370; US 2011293103; US 2011317858; WO 2005094157; EP 2736272; US 2013101136; US 2015049892; US 2010131269; U.S. Pat. No. 4,751,738; U.S. Pat. No. 5,737,430; U.S. Pat. No. 5,563,951; U.S. Pat. No. 5,757,929; WO 2004028203; U.S. Pat. No. 6,424,721; U.S. Pat. No. 9,202,455.

However, no relevant information has been found on defining an optimized microphone layout in an array, based on peculiarities of the sound waves generated by a speaking user and propagating in the area of the user's head. Thus, the inventor performed extensive research works in order to define an advantageous microphone layout in a microphone array, which allowed him building an advanced model for implementing principles described in his earlier publication [9]. Further development of these principles ensured the inventions set forth in the following description and drawings.

SUMMARY OF THE INVENTION

Accordingly, the present invention is directed to a headset for a mobile electronic device or by a wearable telecommunication device comprising earphones that substantially obviates one or more of the disadvantages of the related art. A headset for a mobile electronic device or a wearable telecommunication device comprising earphones, which prevent substantial changing the user's appearance while wearing thereof, and assure convenient use with no restricting freedom of user's movement, and can be effectively controlled directly through the user's clothes.

These and other advantages are assured by a headset for a mobile electronic device, comprising: a neck-wearable housing having a generally U-shape with an electrical connector attached thereto, two in-ear earphones, two cords, each connected at one end to a corresponding in-ear earphone and connected at its other end to the electrical connector wherein the two cords are mechanically connected to the neck-wearable housing, and points of connection of the cords to the neck-wearable housing are in close proximity to each other and form a dorsal cord connection node, and wherein the two cords are also mechanically connected to each other in sections between the in-ear earphones and the dorsal cord connection node to form a suboccipital cord connection node at the connection point.

In the exemplary headset the dorsal cord connection node and the suboccipital cord connection node may be located on a dorsal surface of a neck, and cords in sections between the in-ear earphones and the suboccipital node may be located over an auricle.

In the exemplary headset the suboccipital cord connection node may be a clip adapted to move along the two cords for adjusting a length of the two cords, the suboccipital node may comprise an electrical connector for disconnecting the cords.

In the exemplary headset the cords may be a helical spring in a section between the suboccipital and dorsal cord connection nodes.

The exemplary headset may further comprise an electronic unit, buttons, a power supply.

The exemplary headset may further comprise at least one noise reduction microphone array disposed on the mobile electronic device.

In the exemplary headset the neck-wearable housing may be flexible in at least one location.

The above-stated and other advantages are also assured by a wearable telecommunication device, comprising a neck-wearable housing with an electronic unit attached thereto, two in-ear earphones, two cords, one of which connects to one of the in-ear earphone to the electronic unit, and the other cord connects the other in-ear earphone to the electronic unit; and a microphone array for picking up and processing a user's voice, the microphone array comprising a front microphone, a rear microphone and a processor, wherein the two cords are mechanically connected to the neck-wearable housing, and points of connection of the two cords to the neck-wearable housing are close to each other and form a dorsal cord connection node, and are further mechanically connected to each other in sections between the in-ear earphones and the dorsal cord connection node to form a connection point wherein the suboccipital cord connection node, the dorsal cord connection node, and an area of the housing close to the dorsal cord connection node form a rear portion of the wearable telecommunication device wherein the rear microphone is fixed on the rear portion and wherein a front-facing portion of the neck-wearable housing is in contact with an upper chest when worn by the user.

In the exemplary device the rear microphone may be is fixed on the suboccipital cord connection node, on the neck-wearable housing close to the dorsal cord connection node, between the suboccipital cord connection node and the dorsal cord connection node, or on the additional spring between the suboccipital cord connection node and the dorsal cord connection node.

In the exemplary device the rear microphone may detect surrounding noise, and wherein a correlated portion of the signal from the rear microphone and the signal from the front microphone represent noise, while an uncorrelated portion of the signal represents a useful data.

In the exemplary device signals from the rear microphone and the front microphone may be ignored when their correlation is above a pre-defined threshold.

In the exemplary device the front microphone may be fixed on the front-facing portion of the neck-wearable housing.

In the exemplary device the microphone array may include at least two front microphones, wherein the two front microphone may be fixed on the front-facing portion of neck-wearable housing at a substantially the same height when worn by the user and one of the at least two front microphones may be close to or below a right clavicle of the user, and the other of the at least two front microphones may be close to or below a left clavicle of the user.

The exemplary device may further comprise at least one gradient microphone array comprising at least two front microphones fixed on the front-facing portion of the neck-wearable housing at different heights when worn by the user, wherein the gradient microphone array may be used to determine a directional diagram of received sound waves.

The exemplary device may further comprise at least one phased microphone array comprising at least two front microphones fixed on the front-facing portion of the neck-wearable housing at different heights when worn by the user, wherein the phased microphone array may be used to determine a directional diagram of received sound waves.

The exemplary device may further comprise an electronic accessory in a form of a wrist watch or a finger ring which may be wirelessly connected to the electronic unit, wherein the electronic accessory may include the front microphone.

The exemplary device may further comprise an electronic accessory in a form of eyeglasses, which is connected to the electronic unit, wherein the electronic accessory may include the front microphone.

In the exemplary device a neck-wearable housing may be generally U-shaped or O-shaped and the neck-wearable housing may be flexible in at least one location.

The above-stated and other advantages are also assured by a wearable telecommunication device, comprising a neck-wearable housing configured to be mounted on a human body and in contact with back, left, right sides of the neck and upper chest and having at least one electronic unit attached thereto, two in-ear earphones, two cords, one of which connects to one of the in-ear earphone to the electronic unit, and the other cord connects the other in-ear earphone to the electronic unit, a microphone array for picking up and processing a user's voice, comprising a front microphone, a rear microphone and processor, wherein the two cords are mechanically connected to the neck-wearable housing and points of connection of the two cords to the neck-wearable housing are close to each other and form a dorsal cord connection node, and are further mechanically connected to each other in sections between the in-ear earphones and the dorsal cord connection node to form a suboccipital cord connection node at the connection point, wherein the rear microphone is on a portion of the neck-wearable housing configured to be in contact with a back of the neck when worn by the user; and wherein a correlated portion of the signal from the rear microphone and the signal from the front microphones represents noise, while an uncorrelated portion of the signal represents useful data.

In the exemplary device the rear microphone may be fixed on the suboccipital cord connection node, the neck-wearable housing close to the dorsal cord connection node, between the suboccipital cord connection node and the dorsal cord connection node, on an additional spring between the suboccipital cord connection node and the dorsal cord connection node.

In the exemplary device the front microphone may be fixed on a portion of the neck-wearable housing that is in contact with the user's chest when worn by the user.

In the exemplary device signals from the rear microphone and the front microphone may be ignored when their correlation is above a pre-defined threshold.

The exemplary device may form an output signal $e_n$ as: $e_n = d_n - y_n$, where $y_n$ is a correlated signal representing filtered noise calculated as: $y_n = w_n^T x_n$, where $x_n$ is a combined signal from the rear microphones, $d_n$ is a combined signal from the front microphones, $w_n$ are adaptive filter coefficients defined as: $w_{n+1} = w_n | \mu e_n x_n$, where $w_{n+1}$ is a set of coefficients at a current moment of time n+1, $w_n$ is a set of coefficients at a previous moment of time, n is defined by a clock rate of the incoming data stream, $\mu$ is a positive value defining stability and convergence rate.

The exemplary device may form an output signal $e_n$ based on a Filtered-X Least-Mean-Square (FXLMS) Algorithm: $e_n = d_n - P(z) y_n$, where $d_n$ is a combined signal from the front microphones, $P(z)$ is a transfer function, and $y_n$ is a correlation signal defined by: $y_n = w_n^T x_n$, where $x_n$ is a combined signal from the rear microphones, $w_n$ are adaptive filter coefficients defined as: $w_{n+1} = w_n + \mu e_n \bar{r}_n$, where $w_{n+1}$ is a set of coefficients at a current moment of time n+1, $w_n$ is a set of coefficients at a previous moment of time n, n is defined by a clock rate of the incoming data stream, $\mu$ is a positive value defining stability and convergence rate, $\bar{r}_n$ is a vector formed by current and previous values of a filtered base signal $r_n$ according to: $r_n = \hat{P}(z) x_n$, where $\hat{P}(z)$ is based on a Least Mean Squares Algorithm that corresponds to a finite impulse response (FIR) filter.

In the exemplary device the microphone array may include two front microphones, wherein the two front microphones are fixed on a portion of the neck-wearable housing that is in contact with the user's chest and at a substantially the same height when worn by the user and one of the two front microphones is close to or below a right clavicle of the user, and the other of the two front microphones is close to or below a left clavicle of the user.

The exemplary device may further comprise at least one gradient microphone array comprising at least two front microphones fixed on the front-facing portion of the neck-wearable housing at different heights when worn by the user, wherein the gradient microphone array may be used to determine a directional diagram of received sound waves.

The exemplary device may further comprise at least one phased microphone array comprising at least two front microphones fixed on the front-facing portion of the neck-wearable housing at different heights when worn by the user, wherein the phased microphone array may be used to determine a directional diagram of received sound waves.

In the exemplary device the rear microphone may be used as a detector of surrounding noise wherein a correlated portion of the signal from the rear microphone and the signal from the front microphone represents noise, while an uncorrelated portion of the signal represents a useful data.

In the exemplary device signals from the rear microphone and the front microphone may be not transmitted when their correlation is above a pre-defined threshold.

In the exemplary device the neck-wearable housing generally may be U-shaped (or an otherwise open shape) or O-shaped (or an otherwise closed shape) and the neck-wearable housing may be flexible in at least one location.

The above-stated and other advantages are also assured by a wearable telecommunication device, comprising a flexible neck-worn sheath with at least one electronic unit attached thereto, two in-ear earphones, two cords, one of which connects to one of the in-ear earphone to the electronic unit, and the other cord connects the other in-ear earphone to the electronic unit, wherein the two cords are mechanically connected to the neck-worn sheath, and points of connection of the two cords to the neck-worn sheath are close to each other and form a dorsal cord connection node, and are further mechanically connected to each other in sections between the in-ear earphones and the dorsal cord connection node to form a suboccipital cord connection node at the connection point; and a rear microphone in the suboccipital cord connection node or in the dorsal cord connection node.

Dramatic quality improvement in receiving the user's speech in wearable telecommunications devices, headsets, wearable multimedia devices, wearable voice-controlled computer devices, hearing aids, etc., is achieved by the invention owing to an innovative configuration of the microphone array and correlation processing method of the microphone signals, wherein a microphone array comprising one or more rear microphones placed in the dorsal and/or suboccipital node and used as noise receiver(s) is used for determination of correlated and non-correlated components of the microphone signals, and wherein the correlated components are treated as a noise signal and the non-correlated components are treated as a target signal, in order to increase the signal-to-noise ratio of a target signal which is the output speech signal of the device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 2A and FIG. 2B illustrate a mathematical model of the neck surface where a headset has two nodes and the head is shown in the normal position and may rotate by an angle π/2.

FIG. 3A and FIG. 3B illustrate a mathematical model of the neck surface where a headset has a single node and the head is shown in the normal position and may rotate by an angle π/2.

FIG. 4A and FIG. 4B illustrate a mathematical model of the neck surface where a headset has two side nodes and the head is shown in normal position and may rotate by an angle π/2.

FIG. 5A illustrates a mathematical model of the neck surface where a headset has two nodes and the head is tilted vertically.

FIG. 5B illustrates the calculation of the length of segment AB when the head is tilted forward by an arbitrary angle α.

FIG. 6A and FIG. 6B illustrate a mathematical model of the neck surface where a headset has a single node and two side nodes, correspondingly, and the head is tilted vertically.

FIG. 7A and FIG. 7B illustrate a mathematical model of a head tilted sideway where a headset has two nodes and where a headset has two side nodes.

DETAILED DESCRIPTION OF THE PREFERRED EMBODIMENTS

Figure 1:
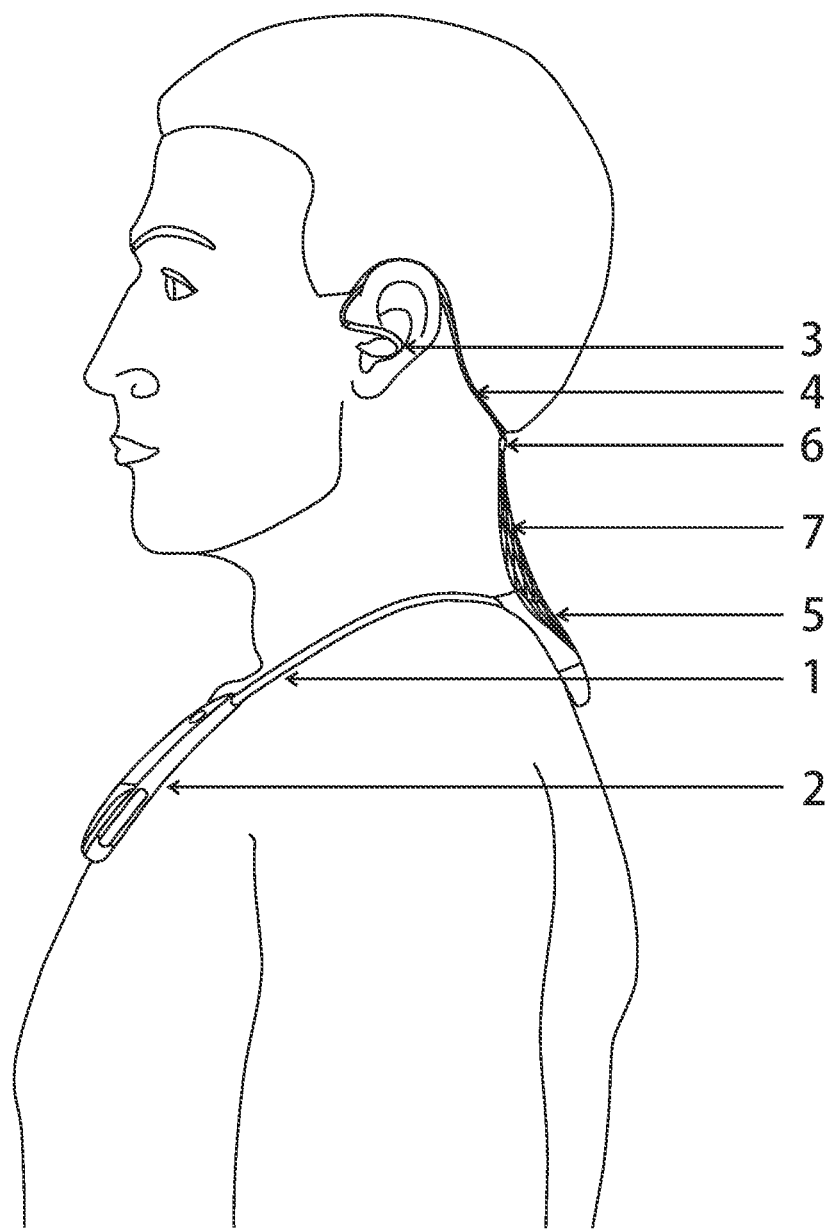
FIG. 1 shows a general view of a wearable device according to the invention in the operational position of the earphones, placed on the user.

Reference will now be made in detail to the preferred embodiments of the present invention, examples of which are illustrated in the accompanying drawings.

In order to assure wearing a device on the user's body without additional support, it is expedient to provide the device in the form of a loop or a half-loop.

When a user wears a headset with neck-wearable housing having a generally U-shape (FIG. 1), a node that connects earphone cords 5 to a neck-wearable housing 1 rests on the dorsal surface of the user's neck, in the region of the seventh cervical vertebra. Slightly lower on the human body, there is a deepening trough, lying between the spinous and transverse processes of the vertebrae, sulcus dorsalis, at the level of the second—third thoracic vertebrae in the interscapular region, where a depression of various depth of about 4×5 cm (depending on the user's constitution and development of subcutaneous fat) is formed at the place of attachment on the medial edges of both blades of serratus anterior muscle, and a large and minor rhomboids muscles (musculae rhomboidei major et minor). The depression may receive a cord winding mechanism and an earphone storage pocket, without projecting above the surface of the body and so without causing inconvenience to the user.

From the cord connection node on the neck part, the cords run up on the dorsal surface of the neck to the back of the head, on the paravertebral deepening, sulcus costae vertebralis major, not reaching the outside occipital protuberance at the level of the first or second cervical vertebrae, where an additional cord connection node, suboccipital node 6, is appropriate to arrange. If the cords are directed in a V manner from the suboccipital node in the oblique anterior-upward direction slightly above or at the hairline, which is almost coinciding with the upper occipital skull line, through the mastoid regions (regiones mastoideae) of the neck, above the mastoid processes, through the projection of ligamentum auriclere superior, which attaches the top part of the auricler cartilage to the squamous part of the temporal bone on the upper portion of the auricle between the front curl and tragus of the outer ear to a fixation point in the earphone 3 of the appropriate side.

Then the stable position of the suboccipital cord connection node will be provided by the availability of fixing anatomical structures at the datum point, such as the external occipital protuberance and lateral occipital projections, while a snug fit of the cords on the scalp is provided by stretching them on the dorsal surface of the head and neck in the places where the cords pass like a girth due to the partial hook-like overlap of the earphone cords through the ligamentum auriclere with additional fixing of the earphones inside the auricle.

With such attachment only the cords in the portion 7 between nodes 5 and 6 are movable, and only this portion may have a slack for compensation of the cord length, which changes when the head turns in the horizontal plane, tilts back, rocks from side to side, as well as when the movements are combined, that is, in all options that can arise in closed kinematic chains of the neck.

Cords 4 are relatively snugly fitted to the scalp and fixed relative to the user's head, and their length does not vary with all of the above movements and varies so little that these variations can be neglected.

Adherence and immobility of the cords 4 between the nodes are also promoted by the cellular connective tissue structure of the subcutaneous fat of the occipital region, a minor displacement of the skin in the area, the presence of Langer's lines running in the transverse direction in the skin, as well as the passage of the cord on a hollow of the postural cavity, the hook-like overlap of the cords and positioning the earphones in the outer ear.

In conjunction with the suboccipital node, the tension and absence of slack are further provided by the design of the earphone, which is placed inside the auricle, in most cases, without an arc, but having a stiff part—an earphone arm attached to the earphone body lying in the outer ear and continued upward from the helical root on the ascending part of the helix to the ligamentum auriclere superior, the attachment point of the top of the auricle to the temporal bone.

A flexible cord extends from the stiff arm, leaning over the above ligamentum auriclere superior at an angle of less than 45°, which contributes to the fact that the rigid arm of the earphone forms a lever, where at accidental tearing off of the earphone cords, that is, when the cords are pulled at down and back tension vector, the arising moment abuts the earphone against the tragus, thereby fixing the earphone between the tragus and the external auditory canal.

It shall be noted that it is preferred to use in-ear earphones, which are fully or partially inserted into the external auditory canal, in comparison with those in-ear earphones, which are placed within the auricle and are not inserted, wholly or partially, into the external auditory canal.

In terms of biomechanics, it shall be noted that movements of the head are described on the basis of closed kinematic patterns, and extrapolation of even fairly complex combinations of head movements to the fixation points can be considered in only one narrative category—as lengthening-shortening the cord portion between the dorsal cord connection node on the neck-wearable housing and the cord connection suboccipital node, which is almost stationary relative to the head and lies under the outer posterior occipital protuberance.

To construct a closed kinematic model, a headset can be represented as having two basic parts and a movable connection thereof (FIG. 1).

A first part (head part) is stationary relative to the user's head; it has two earphones 3, two earphone cords 4 enveloping the auricle from above, and a suboccipital node 6.

A second part is stationary relative to the user's body; it has a neck part 1 and a cord connection node disposed on the neck-wearable housing on the dorsal surface of the neck, a dorsal node 5.

As shown in FIG. 1, positions of the cord connection nodes has been chosen at reference numeral 5, point A and reference numeral 6, point B (FIG. 2A, FIG. 2B). In this case, the length of the free-hanging cord 7 in the portion between the nodes should be minimal.

To determine the length of the AB portion, variations in the distance between points A and B as the head turns are to be considered. In this case, "distance" is the length of the geodesic line connecting points A and B on the surface of the neck (FIG. 2B). First, let us define the extension of the cord when the head rotates sideways. Maximum angle of rotation of the head is 90°. Let us determine the AB distance.

To determine the length of the geodesic line it is necessary to describe mathematically the surface of the neck and possible movements of the head and neck. The neck surface can be represented with sufficient accuracy as a cylinder (FIG. 2A). Head and neck can make the following motions: bending-tilting forward, extension/tilting backward, abduction and adduction/tilting to the left and to the right, turns to the left and to the right. High movability of the cervical spine is caused by its segmentation: having a height of about 13 cm, it contains seven medium-sized vertebrae and six high intervertebral discs.

Between the first cervical vertebrae and the occipital bone, in the atlantal-occipital joint, adduction/abduction and flexion/extension of the head are performed, and between the first and second cervical vertebra turns of the head to the right and the left are performed. The joint work of these joints provides the head movement about three axes. Thus, combined movements of the head and neck are made in relation to the body, while independent movements of the head are made in relation to the neck. This is because the cervical spine is very flexible, and independent movements are possible between the first and second cervical vertebrae.

Let us consider the behavior of the kinematic model of the headset when the head rotates in the horizontal plane.

When the head rotates in the horizontal plane, the neck twists mainly in the region between the first and second vertebrae. Moreover, since the cervical spine is located closer the back of the neck, the twisting axis is also close to the back surface of the cylinder. Since the twisting is performed only in the upper part of the cylinder about a non-central axis, the cylinder surface is distorted. The distortion is most strongly manifested in the region of the first and second cervical vertebrae, just where point B lies.

The main part of the geodesic line passes below the distortion, so in the calculations we assume the surface as cylindrical. An important issue is the determination of the location of point B when the upper part of the cylinder is twisted to a maximum angle $\alpha=\pi/2$. Since ears are symmetric about the twisting axis, that is the axis of the vertebral column, and the point B is fixed by the tensioned cords in symmetrical position as well, the position of point B can be expected in the next central angle $\phi$ (FIG. 2B).

$$\varphi = \arcsin\left(\frac{R-D}{R}\right) \tag{1}$$

The height of point B will not change at rotation either, because it is fixed by the tensioned earphone cords.

Let us consider the task of geodesic line of a cylinder having base radius R and height h (FIG. 2B). The line passes through two diametrically opposite points on different basis.

The geodesic line length is $$ds = \sqrt{dx^2 + dy^2 + dz^2}$$

shown in differential form.

Since the curve lies on the surface of the cylinder, it is convenient to use cylindrical coordinates, with $dx^2 + dy^2 = R^2 d\phi^2$, where $\phi$ is the polar angle (FIG. 2B). In polar coordinates, the task is to find dependence $z(\phi)$, at which the length of the curve is minimal or when the function $$S = \int_0^{\varphi_0} \sqrt{R^2 + z'^2}\, d\varphi \tag{2}$$

is minimal.

From calculus, a minimum is reached for the curve that satisfies the Euler equation, in this case:

$$\left(\frac{z'}{\sqrt{R^2 + z'^2}}\right)' = 0 \tag{3}$$

It follows that $z'(\phi)=a$, where a is the constant factor, then $z(\phi)=a\times\phi+b$. Coefficients are determined though boundary points A (R,0,0), the attachment point of the lower clip, and B (R,$\phi_0$,h) with the polar angle $\phi=0$ being at point A and equal to $\phi_0$ at point B. Then the coefficients are of the form: $a=h/\phi_0$, $b=0$. Then $z(y)=\phi\times h/\phi_0$. And the length of the curve is equal to the value of the functional, i.e.:

$$S = \int_0^{\varphi_0} \sqrt{R^2 + h^2/\varphi_0^2}\, d\varphi = \sqrt{\varphi_0^2 R^2 + h^2} \tag{4}$$

Thus, variation in distance AB or movability of cords $\Delta S$ is:

$$\Delta S = \sqrt{h^2 + R^2 \phi_0^2} - h \tag{5}$$

where R—the radius of the cylinder, $\phi_0$—the angle of rotation of node B, defined relative to the central axis of the cylinder, h—the height of the node. With regard to expression (1) the expression for movability of the cords is:

$$\Delta S_t = \sqrt{h^2 + R^2 \arcsin^2\left(\frac{R-D}{R}\right)} - h. \tag{6}$$

Now, for comparison, we will consider variation in the length of cords at horizontal rotation of the head in conventional headsets. FIG. 3A shows an example of such a headset. In this case, cords are clamped at point A, and the movable part is the entire cord from point A to earphones disposed at points C and D.

Conventionally, the headset is denoted as a single node headset. Thus, movability of the cords can be determined from the difference between the distances from point A and D when the head rotates at the angle of 90° in one direction and in the other direction, since while the distance or the geodesic line length increases in one direction, it decreases in the other direction. These two distances can be determined in FIG. 3B, where the minimal distance is the length of line AC, and the maximum distance corresponds to line AD. As a result, movability of the cords can be found from expression (5) with the assumption of h=H and $\phi_0=\pi$, and it has the form:

$$\Delta S_{t1} = \sqrt{H^2 + R^2 \pi^2} - H \tag{7}$$

Let us consider another type of a headset, which will be conventionally called a headset having two side nodes (FIG. 4A). In this case assume that the headset cord, at rotation, always passes through points at the base of the cylinder, i.e., points A and B, cord connection nodes. Then the minimum distance between points A and C or B and D is H. The maximum distance when the head is rotated to 90° is shown by geodesic lines AC and BD (FIG. 4B). As a result, movability of the cords is also determined from expression (5) with the assumption of h=H and $\phi_0=\pi/2$, and is defined by the following expression:

$$\Delta S_{c2} = \sqrt{H^2 + R^2\pi^2/4} - H \quad (8).$$

Next, let us consider behavior of the kinematic model when the head tilts forward and backward in the vertical plane.

Tilts of the head are performed by rotation of the head around the axis extending between the first cervical vertebra and the occipital bone. The tilt is often accompanied by a tilt of the entire cervical spine. In a headset having two nodes, the tilt of the neck has a little effect on distance AB, but rotation of the head has a significant impact, since node B is disposed directly on the occipital part. Thus, knowing distance from B to axis of rotation r and angle of rotation α (FIG. 5A), shift of node B can be estimated as $$BB_0 = r\alpha \quad (9).$$

Now we will obtain an expression for the length of segment AB at arbitrary angle α from the triangle AOB (FIG. 5B):

$$AB^2 = AO^2 + r^2 - 2AO \times r \times \cos(\alpha + \beta) \quad (10).$$

Distance to axis r can be determined though the distance from the back surface of the neck to the center of the cervical spine, i.e., R-D, and the difference of heights of point B and the axis of rotation of the head $h_0$:

$$r = \sqrt{(R-D)^2 + h_0^2} \quad (11).$$

Then we will obtain the following expression from triangle $OO_1A$:

$$AO = \sqrt{(R-D)^2 + (h+h_0)^2} \quad (12).$$

Expression for angle β can be obtained from expressions (10), (11) and (12) by substituting α=0, AB=h.

$$\beta = \arccos \frac{(R-D)^2 + hh_0 + h_0^2}{\sqrt{((R-D)^2 + (h+h_0)^2)((R-D)^2 + h_0^2)}} \quad (13).$$

Thus, the expression for AB has the form:

$$AB(\alpha) = \sqrt{2(R-D)^2 + (h+h_0)^2 + h_0^2 - 2\sqrt{((R-D)^2 + (h+h_0)^2)((R-D)^2 + h_0^2)}\cos(\alpha+\beta)} \quad (14)$$

In case of tilting, the head backward expression (14) is no longer true, because there is no tension of the skin and soft tissues of the dorsal part of the neck. In this case it is appropriate to estimate distance BB0 as the difference between heights of points B and $B_0$:

$$\Delta h = r(\cos(\gamma_0 + \alpha) - \cos\gamma_0) \quad (15).$$

As a result, movability of the cords is calculated from expression (14) by substituting $\alpha = \alpha_m$ (maximum tilt angle), and (15) by substituting $\alpha = -\alpha_m$:

$$\Delta S_c = AB(\alpha_m) - \sqrt{(R-D)^2 + h_0^2}(\cos(\gamma_0 - \alpha_m) - \cos\gamma_0) \quad (16).$$

Apparently, $\alpha_m$ cannot exceed $\gamma_0$ due to the limit on deformation of the neck. To assess movability of the cords, we may assume $\alpha_m = \gamma_0$, then with regard to expression (14) we may obtain:

$$\Delta S_c = AB(\gamma_0) - \sqrt{(R-D)^2 + h_0^2}(1 - \cos\gamma_0) \quad (17).$$

In case of headsets with a single node or with two side nodes rotation in the vertical plane affects the height of points C and D. Variation in the latter, $\Delta h_0$, can be determined if relative distance $r_0$ between axis CD and the axis of rotation, as well as angular position $\alpha_0$ of the axes are known (FIG. 6A):

$$\Delta h_0 = r_0(\cos\alpha_0 - \cos(\alpha_0 + \alpha)) \quad (18).$$

As a result, variation in the distance or movability of cords for a headset having a single node can be obtained from expression (4) with H−$\Delta h_0$ set instead of h and $\phi=\pi/2$. In this case, angle α varies in the range $-\alpha_m < \alpha < \alpha_m$, and the height varies in the range:

$$\Delta h_{01} = r_0(\cos\alpha_0 - \cos(\alpha_0 - \alpha_m)) < \Delta h_0 < r_0(\cos\alpha_0 - \cos(\alpha_0 + \alpha_m)) = \Delta h_{02} \quad (19),$$

$$\Delta S_{c1} = \sqrt{(H - \Delta h_{01})^2 + R^2\pi^2/4} - \sqrt{(H - \Delta h_{02})^2 + R^2\pi^2/4} \quad (20).$$

FIG. 6B illustrates the case of a headset having two side nodes. Movability of the cords can be estimated through variation in heights of points C and D. Then, from expression (19) we can obtain movability of the cords in the following form:

$$\Delta S_{c1} = \Delta h_{02} - \Delta h_{01} \quad (21).$$

Like in the case of a headset having two nodes, estimates $\alpha_m = \gamma_0 = \alpha_0$ are true. Then we may obtain the following estimate for movability of cords:

$$\Delta S_{c1} = \sqrt{(H + r_0(1 - \cos\gamma_0))^2 R^2\pi^2/4 - \sqrt{(H - r_0(\cos\gamma_0 - \cos 2\gamma_0))^2 + R^2\pi^2/4}} \quad (22),$$

$$\Delta S_{s2} = r_0(1 - \cos 2\gamma_0) \quad (23).$$

Also consider behavior of the kinematic model when the head tilts sideway in the vertical plane.

When the head tilts sideway, the movement of the head can be represented as rotation of the upper part of a cylinder about axis s, which extends approximately through point O of intersection of axes t and c.

In the case of a headset having two nodes, such rotation is accompanied by a shift of point B, which can be estimated through the distance to axis of rotation $O_1B_0$ (FIG. 7B). As seen in FIG. 7B: $O_1B_0 = h_0$. To determine the length of AB it is necessary to determine horizontal shift Δs and vertical shift Δh of point B, because $AB = \sqrt{(h+\Delta h)^2 + \Delta s^2}$. In this case $\Delta h = h_0(1-\cos\alpha)$ and $\Delta s = h_0 \sin\alpha$. Then movability of section AB when the head tilts sideway, will be changed to maximum angle $\alpha_m$:

$$\Delta S_s = \sqrt{(h+h_0(1-\cos\alpha_m))^2 + h_0^2 \sin^2\alpha_m} - h \quad (24).$$

Now let us consider the case of a headset having side nodes. In this case, variation in segments AC and BD can be accounted for by considering the shift of points C and D on arcs of circle from points $C_0$ and $D_0$. The length of AC in the case of the head tilt shown in FIG. 7B can be found as:

$$AC = AC_0 + R_s\alpha = H + R_s\alpha \quad (25).$$

Here $R_s$ is the radius of rotation path about axis s, which can be found from triangle $COO_2$, where $OO_2$ can be found, given that the height of point O is $h+h_0$ (FIG. 5B), then $OO_2 = H-h-h_0$, and $CO_2 = R$, therefore:

$$CO = R_s = \sqrt{(H-h-h_0)^2 + R^2} \quad (26).$$

To determine BD, only variation in the height of point D, $\Delta H = R_s \sin\alpha$, should be taken into account because the cord in this area is loose:

$$BD = H - \Delta H = H - R_s \sin\alpha \quad (27).$$

Considering maximum deflection angle $\alpha_m = 45°$, the following expression can be obtained for movability of cords:

$$\Delta S_{s2} = R_s\alpha_m + R_s \sin\alpha_m \quad (28).$$

Figure 8:
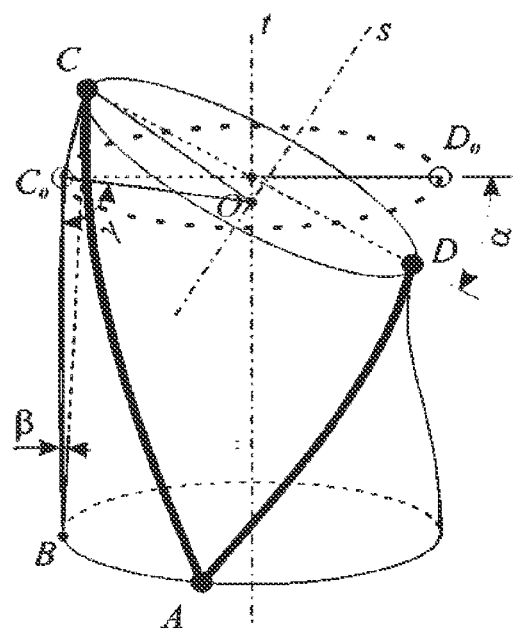
FIG. 8 illustrates a mathematical model of a head tilted sideways where a headset has a single node.

Now we will consider the case of a headset having a single node (FIG. 8). In this case, the calculation is more complicated and requires special treatment for the length of geodesic line AC. In this task the surface of the neck can be described as a surface of an inclined cylinder. To do this, let us find the angle of inclination of the cylinder surface, $\beta$. From triangles $BCC_0$ and $OCC_0$ we may find $CC_0 = 2R_s \sin(\alpha/2)$:

$$BC = \sqrt{H^2 + 4R_s^2 \sin^2(\alpha/2) - 4HR_s \sin(\alpha/2)\sin(\alpha/2-\gamma)} \quad (29).$$

From triangle $BCC_0$ we may obtain:

$$BC/\sin(\pi/2 - \alpha/2 + \gamma) = 2R_s \sin(\alpha/2)/\sin\beta$$

so we may obtain:

$$\beta = \arcsin(2R_s \sin(\alpha/2)\cos(\alpha/2-\gamma)/BC) \quad (30).$$

Here $$\gamma = \arctan(R/(H-h-h_0)) \quad (31).$$

Therefore, $$AC = \sqrt{(BC(1-\sin\beta))^2 + \pi^2 R^2 \cos^2\beta/4} \quad (32).$$

Figure 9:
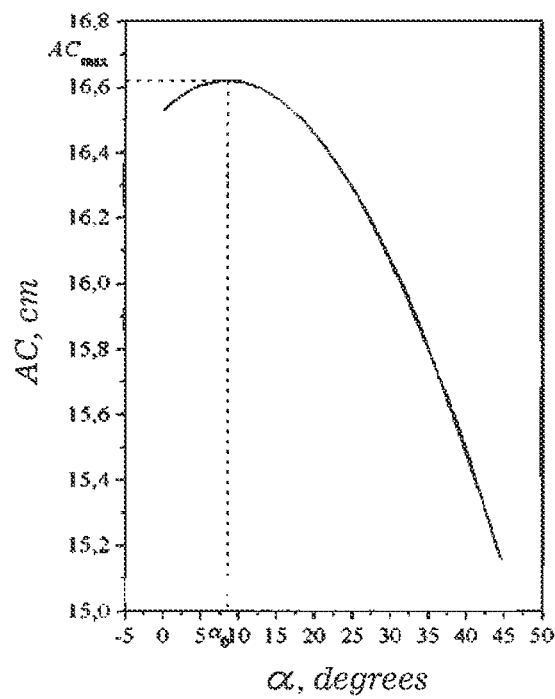
FIG. 9 shows dependence of the length of geodesic line AC on the head tilt angle α.

It should be noted that, taking into account the dependence of BC and $\beta$ on angle $\alpha$ from equations (29) and (30), we can expect a non-monotonic dependence of the line length $AC(\alpha)$. FIG. 9 shows this dependence for parameters listed in Table 1. It can be seen that AC reaches maximum $AC_{max} = 16.6$ cm at angle $\alpha_0 = 8.6°$.

Now let us find the length of AD as this line describes the minimum length of the cord. In this case we may consider that the height of the cylinder has changed to $\Delta H = R_s \sin\alpha$, then using the expression (27) we may obtain:

$$AD = \sqrt{(H - R_s \sin\alpha)^2 + \pi^2 R^2/4} \quad (33).$$

As a result, movability of cords $\Delta S_{s1}$ is determined as the difference of the lengths of lines $AC_{max}$ and AD at the maximum angle of inclination, $\alpha_m$:

$$\Delta S_{s1} = AC_{max} - \sqrt{(H - R\sin\alpha_m)^2 + \pi^2 R^2/4} \quad (34).$$

Table 1 shows the comparison of cord movability for various types of headsets. As seen in the table, a headset having two nodes, that is, a headset in which two earphone cords are connected to the neck-wearable housing through a dorsal cord connection node in close proximity to each other and have an additional point of fixation to each other, i.e., a suboccipital node; the cords have the lowest movability as compared with conventional headsets. This advantage applies to all kinds of movements of the head.

Comfortable wear of the headset is determined by the maximum possible movability of cords, respectively, the difference between the minimum and maximum possible length of a loose cord, arising at different positions of the head. In a headset having two nodes, the maximum length is determined by maximum distance AB between the nodes, that is, the length AB defined in expression (14). In a headset having a single node, the maximum length of the cord is achieved when the head rotates to 90°:

$$L_{max\ 1} = \sqrt{H^2 + R^2 \pi^2} \quad (35).$$

For a headset having two side nodes we may obtain the maximum length when the head tilts sideway:

$$L_{max\ 2} = H + R_s\alpha_m \quad (36).$$

Table 1 contains numerical estimates, from which it follows that the headset having two nodes has a minimum length of a maximum extended, but slack portion of cord. It should also be noted that the estimates obtained for a headset having two side nodes have been deliberately reduced because cords passing from points A and B to the transceiver are not taken into account, and account of them would significantly increase $L_{max2}$.

Figure 10:
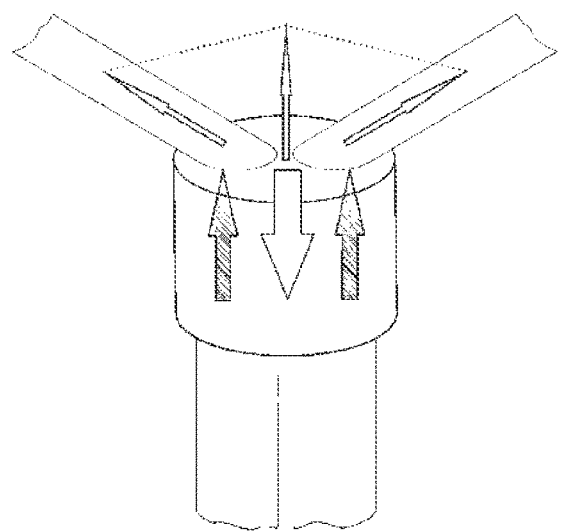
FIG. 10 is a vector diagram of forces.

Therefore, the availability of two optimally positioned nodes A and B contributes not only to reduction in slacking of the cords, but also provides tension of the cords extending from node B to earphones. Since these cords lie on the curved surface of the neck, the tension creates a pressure on the skin (FIG. 10). As a result of this pressure there arises a friction force of the cord against the skin and a pressure force of the suboccipital cord connection node, node B, against soft tissues, while the difference of vectors of these forces leads to fixation of the cords on the scalp and further secures earphones in the auricle. Thus, the securing force is concentrated not only on the auricles, and not only by fixing the earphones in the external auditory canal, but it is uniformly distributed over the entire length of the cord, which greatly facilitates wearing of the earphones. Node B, i.e., suboccipital cord connection node, is held in a stable position owing to the uniform distribution of various forces that arise in the occipital region at the specified arrangement geometry of the cords and their mutual coupling, taking into account human anatomical features.

FIG. 10 shows a vector diagram of projections of the forces acting on the suboccipital cord connection node, node B. Node B is fixed through tension of the cords. Thin arrows indicate tensile forces of the cords, the total of which creates pressure on the skin. As a result, node B undergoes a force of reaction of the skin and surrounding tissues, indicated by wide hollow arrow, that seeks to move the node down, and the arising forces of friction against the cord, marked with wide solid arrow, fix the position of node B. In this model, the tension of cords below the node was neglected, as its length has been chosen for optimal and the cord is loose, and it has an excess length of about 9.8 cm to ensure movability of the cords in movements of the head and neck.

Table 1 summarizes results of comparison of cord movability and maximum cord length in headsets with different geometries.

TABLE 1

Comparison of movability and maximum length of cord in headsets with various geometry

| Headset type | Movement | | | | | |
|---|---|---|---|---|---|---|
| | Rotation of head in horizontal plane | | Tilt of head forward/backward | | Tilt of head sideway | |
| | Expression | Estimate at parameters | Expression | Estimate at parameters | Expression | Estimate at parameters |
| Headset with two nodes | (6) | $R = 6.5$ cm, $h = 6$ cm, $D = 1$ cm, $\alpha = 90° = 1.6$ rad $\Delta S_t = 2.9$ cm | (12) | $R = 6.5$ cm, $h_0 = 2$ cm, $D = 1$ cm $\Delta S_c = 8.6$ cm | (24) | $R = 6.5$ cm, $h = 6$ cm, $h_0 = 2$ cm $\alpha_m = 45° = 0.8$ rad $\Delta S_s = 0.6$ cm |
| Headset with a single node | (7) | $R = 6.5$ cm, $H = 13$ cm $\Delta S_{t1} = 12.5$ cm | (18) | $L_{max} = 9.8$ cm (see expression (14)) $r_0 = 3$ cm, $\gamma_0 = 45°$ $\Delta S_{c1} = 2.2$ cm | (34) | $R = 6.5$ cm, $h = 6$ cm $h_0 = 2$ cm $\alpha_m = 45° = 0.8$ rad $\Delta S_{s1} = 3.4$ cm |
| Headset with two side nodes | (8) | $R = 7$ cm, $H = 13$ cm $\Delta S_{t2} = 5.2$ cm | (19) | $L_{max\_1} = \sqrt{H^2 + R^2\pi^2} = 25.5$ cm $r_0 = 3$ cm, $\gamma_0 = 45°$ $\Delta S_{c2} = 3$ cm $L_{max\_2} = H + R_s\alpha_m = 19.4$ cm | (28) | $R = 6.5$ cm, $h = 6$ cm, $h_0 = 2$ cm $\alpha_m = 45° = 0.8$ rad $\Delta S_{s2} = 11$ cm |

The technical effect provided by the invention includes the ability to reduce the length of the movable portion of the cords between the earphone and the neck-wearable housing, and the adherence of the stationary portion of the cord to the surface of the user's body and fixation of the stationary portion by tension, to substantially eliminate slack of the cords connecting the earphones with the neck-wearable housing, which in turn, prevents breakage of cords or earphones, and provides an additional opportunity for constant wear of the headset by the user in the operational position or with the earphones taken off, because the cords do not impair the aesthetic appearance of the user when the earphones are worn in the operational or non-operational position. Furthermore, a mechanism for full or partial winding up the earphone cords when not in use can be arranged on the headset more easily.

Figure 11:
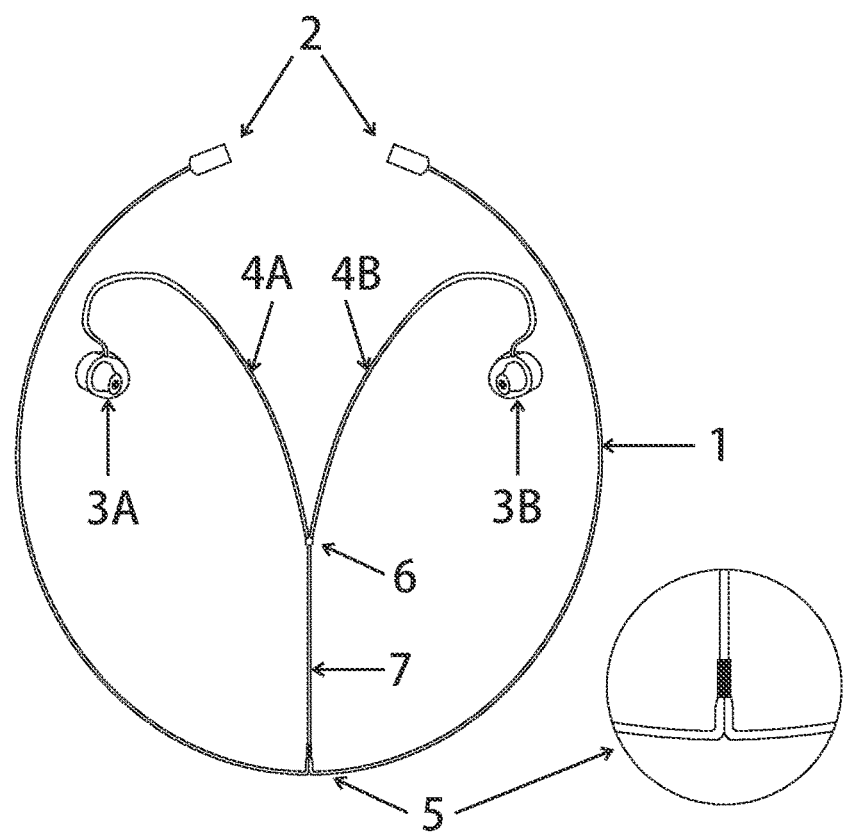
FIG. 11 is a general view of a wearable device according to the invention, with neck-wearable housing having a generally U-shape, showing the primary functional components.

A headset for a mobile electronic device (FIG. 1, FIG. 11) comprises a neck-wearable housing 1 having a generally U-shape with at least one electrical connector 2 attached to it; two in-ear earphones 3A, 3B; two cords 4A, 4B, each connected at one end to a corresponding in-ear earphone and connected at its other end to the electrical connector and these the two cords are mechanically connected to the neck-wearable housing 1, and points of connection of the cords to the neck-wearable housing are in close proximity to each other and form a dorsal cord connection node 5. They are also mechanically connected to each other in sections between the in-ear earphones and the dorsal cord connection node 5 to form a suboccipital cord connection node 6 at the connection point.

When the headset is worn in the operational position, the dorsal cord connection node 5 and the suboccipital cord connection node 6 are located on the dorsal surface of the neck, and cords 4 in sections 7 between the earphones 3 and the suboccipital node 6 are located over an auricle.

Figure 12A:
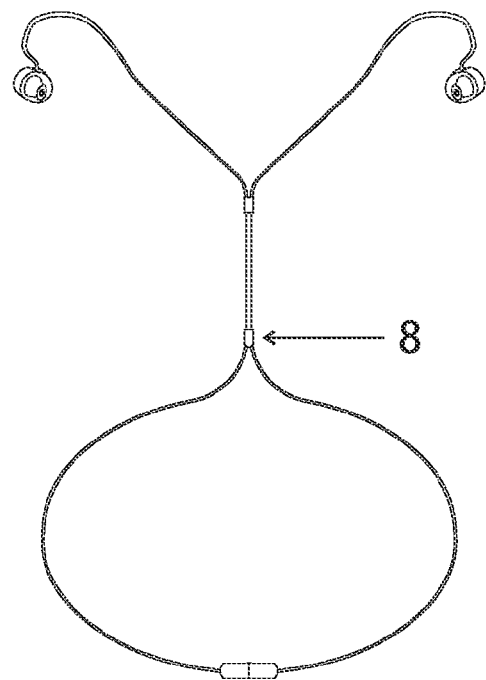
FIG. 12A and FIG. 12B show an embodiment of a headset according to the invention, having a suboccipital node in the form of a clip.
Figure 12B:
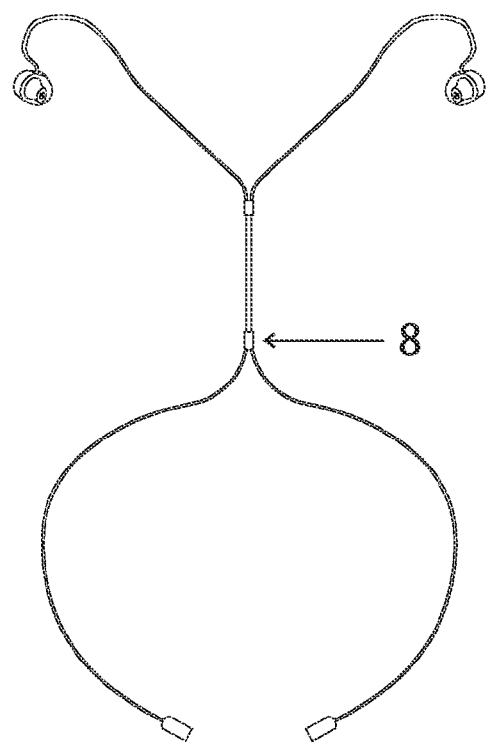

In various embodiments (FIGS. 12A, 12B) the suboccipital cord connection node may be a clip 8, and the length of the cords can be adjusted by moving the clip along the cords. Also, the suboccipital node may include an electrical connector to disconnect the cords.

Figure 13:
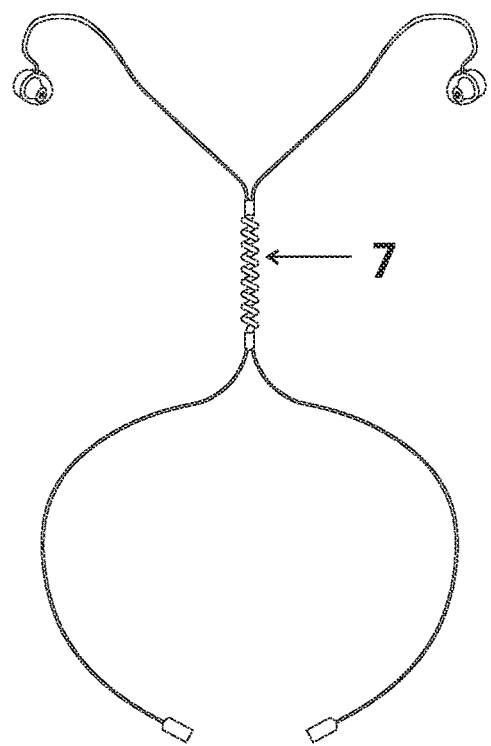
FIG. 13 shows embodiments of a wearable device according to the invention, wherein the cord portion between the suboccipital and dorsal cord connections nodes is provided in the form of a helical cord.

At least one cord in the section 7 between the suboccipital and dorsal nodes can be configured as a helical spring. In the embodiment shown in FIG. 13, the section 7 between the suboccipital and dorsal cord connection nodes is configured in the form of a helical cord and acts as a tension spring. The cords may be formed not only in the form of a helical spring, but also in the form of a flat S-shaped spring, which may be more expedient in some cases, as this allows avoiding distortion of the spring and provides a precisely adjacent position of the suboccipital node in relation to the device when the earphone is in the non-operational position.

Figure 14:
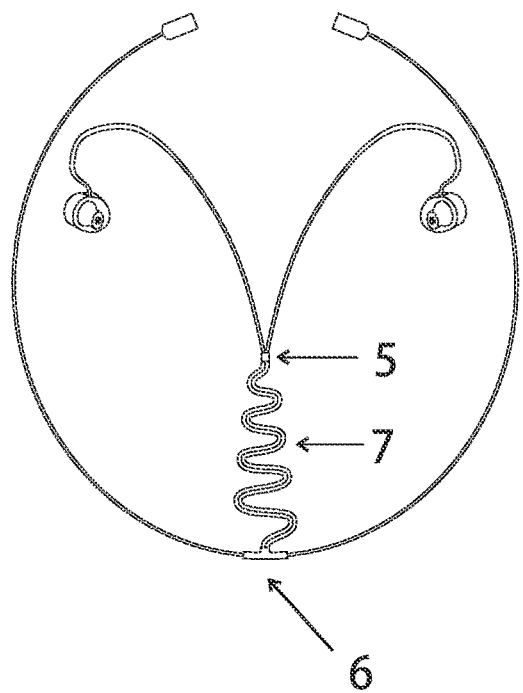
FIG. 14 shows an embodiment of a headset according to the invention, where the integral cord portion between the suboccipital and dorsal cord connection nodes is provided in the form of an S-shaped spring.

An embodiment of the headset using an S-shaped spring is shown in FIG. 14.

In preferred embodiment (FIG. 15), a headset comprises at least one electronic control unit 9 mechanically and electrically connected to an electrical connector. The electronic unit 9 can be placed on the chest at one side of a neck-wearable housing. The electronic unit 9 may comprise a signal transceiver, such as Bluetooth, to receive signal from a cell phone; there may further be a battery, a player, a radio, a USB flash drive, an electronic key, a satellite signal receiver such as GPS and/or GLONASS receiver able to tell coordinates through voice information transmitted directly to the user's earphones.

Figure 16:
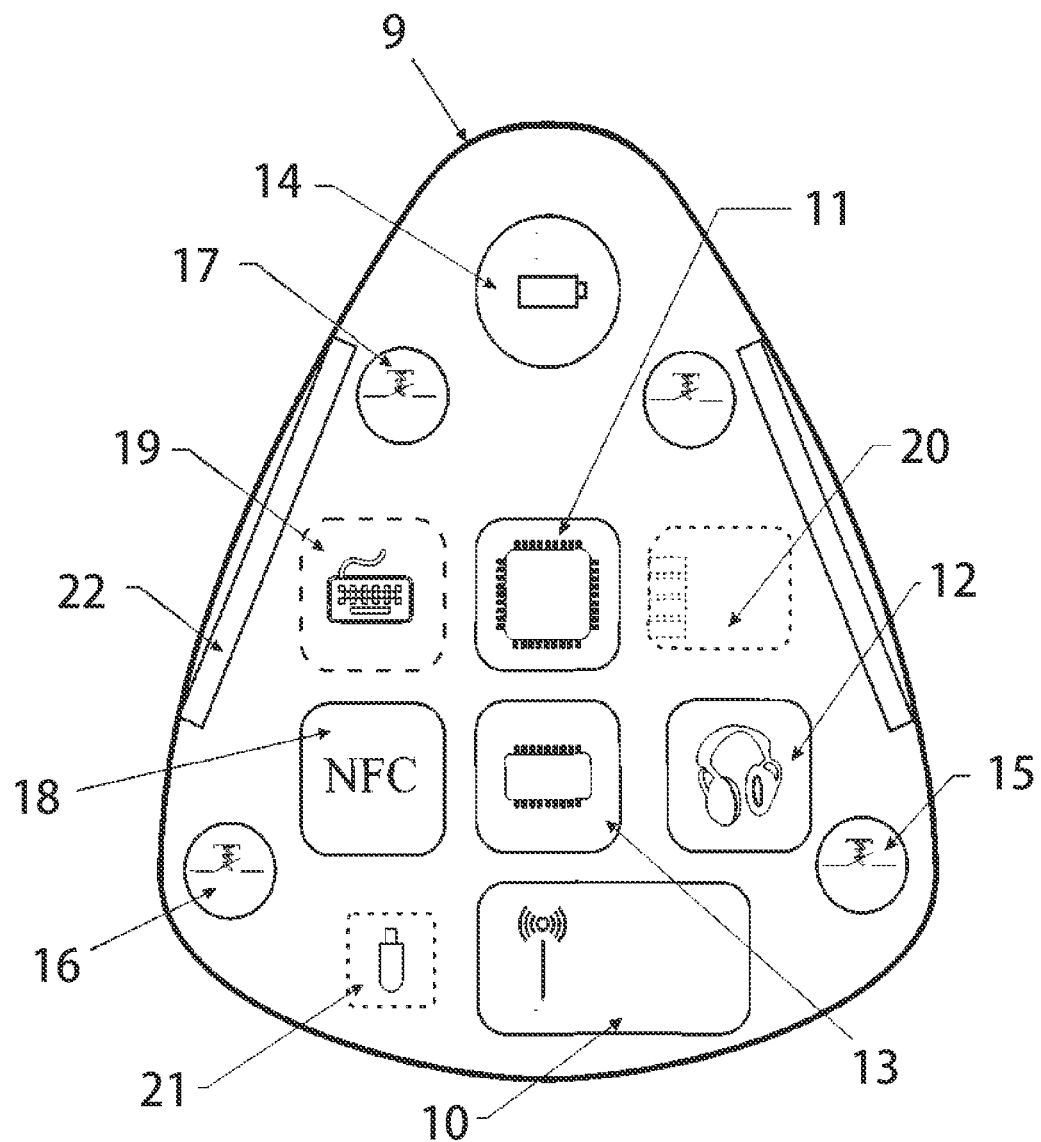
FIG. 16 shows an example of electronic components incorporated into the electronic unit, according to the invention.

FIG. 16 shows possible electronic components incorporated into the electronic unit 9. The electronic unit 9 communicates with a mobile phone, a satellite navigation system, a computer or a mobile station via a radio communications module 10. A signal processor 11 processes audio signals, and controls and manages data streams. Digital-to-analog conversion and amplification of a signal, and volume control are performed by a codec or an audio module 12. A memory module 13 stores control software, hardware setting profiles and user's information. A power source, such as a battery 14 incorporated in the electronic unit 9 and/or disposed on the neck-wearable housing, provides operation of microcircuit chips. The electronic unit 9 may include control buttons, such as 15, 16, and 17. A short-range Near Field Connection module 18 can be used for data exchange and quick coupling with a mobile electronic device.

In various embodiments of a headset the electronic unit 9 accommodates the following accessories: an extra controller 19 for processing signals from control buttons; a slot 20 with a connector to connect an external flash memory, a USB connector 21 for data transfer or charging the battery. Connectors 22 are used to connect earphones, external microphones, and additional control buttons.

Figure 15:
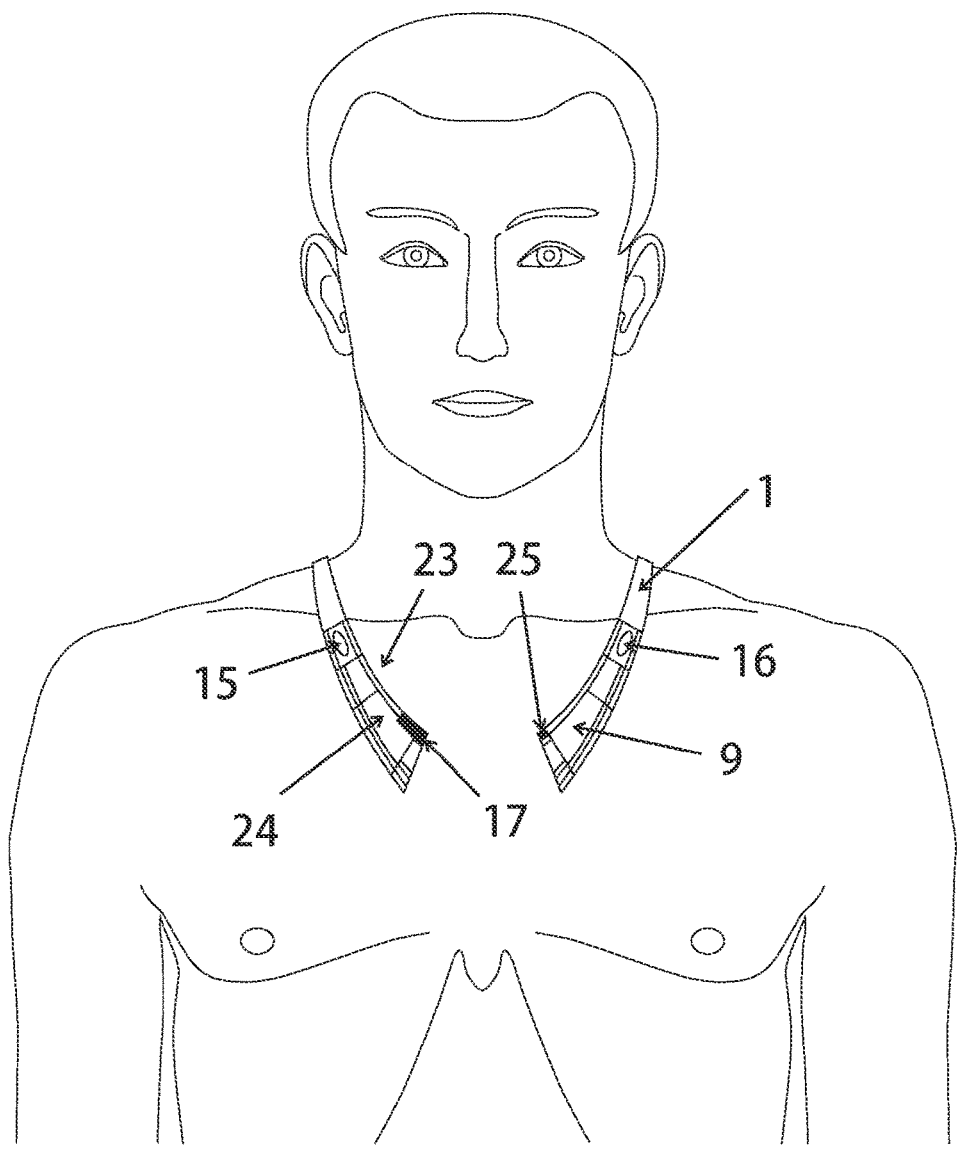
FIG. 15 shows embodiments of a headset comprising an electronic unit, according to the invention.

Buttons 15, 16 can be disposed on the neck-wearable housing 1 (FIG. 15).

In various embodiments of the headset, control buttons and keys are disposed both on the housing of the electronic unit 9 and the neck-wearable housing.

Furthermore, pressure can be made at once on two opposite buttons with two fingers, thumb and forefinger, simultaneously on both sides of the neck-wearable housing relative to the electronic control unit or the rigid member disposing on the neck loop. This eliminates accidental pressure by a vehicle safety belt, a bag strap, etc. Such an arrangement of buttons provides for maximum accessibility to them, even when wearing a tie, suit or coat.

The headset (FIG. 15) may further comprise a rigid member 23 are configured like shells having a polyhedron-like shape, wherein a planes of two narrow facets of the polyhedron-like shape are substantially parallel to each other and substantially perpendicular to the user's body plane, and the rigid member contains a button 17 positioned on the facets near the rigid member's corner where the facet borders another facet being perpendicular to the user's body plane, and the button is configured to be easily found and activated through the clothes when the device is worn under the clothes, wherein intentional activation thereof is possible by catching and holding the member with two fingers.

Herein, control means of the claimed device are mainly described as buttons or keys in examples and embodiments. However, other types of control means may be used depending on the functions controlled by these control means.

In an embodiment of the headset (FIG. 15), a power supply 24 and a microphone 25 can be disposed on a neck-wearable housing 1, for example in a rigid member 23. The power source (e.g., batteries) may be distributed in the electronic unit 9.

Figure 18:
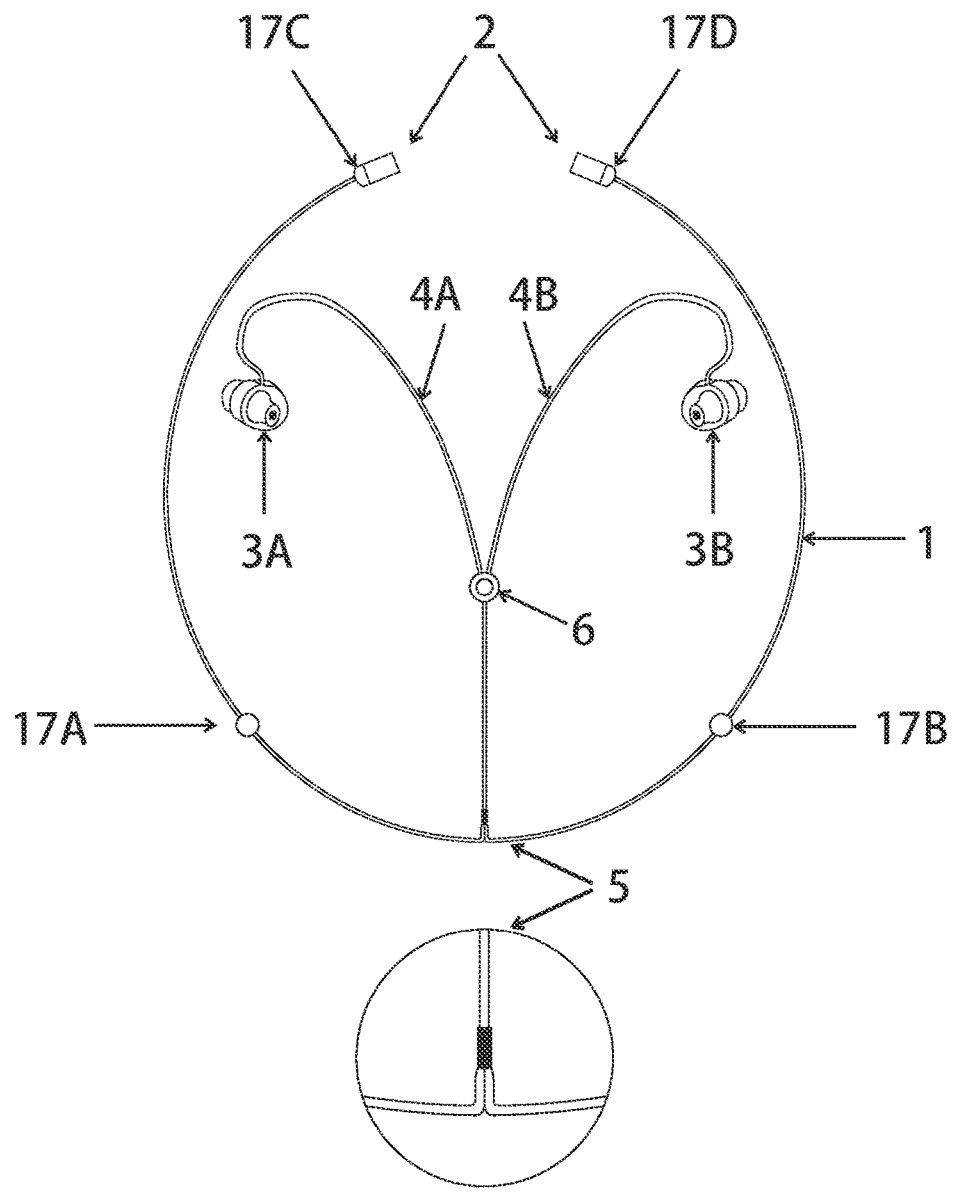
FIG. 18 shows an embodiment of a wearable device according to the invention, with four microphones.

In an embodiment of the headset (FIG. 18), four microphones 17A-D can be disposed on a neck-wearable housing 1 forming a microphone array.

In some embodiments, the headset can be free of cords transmitting signal to the earphone and have a power cord only; a cordless module in each earphone to receive and transmit electromagnetic signal for the earphone.

Figure 17:
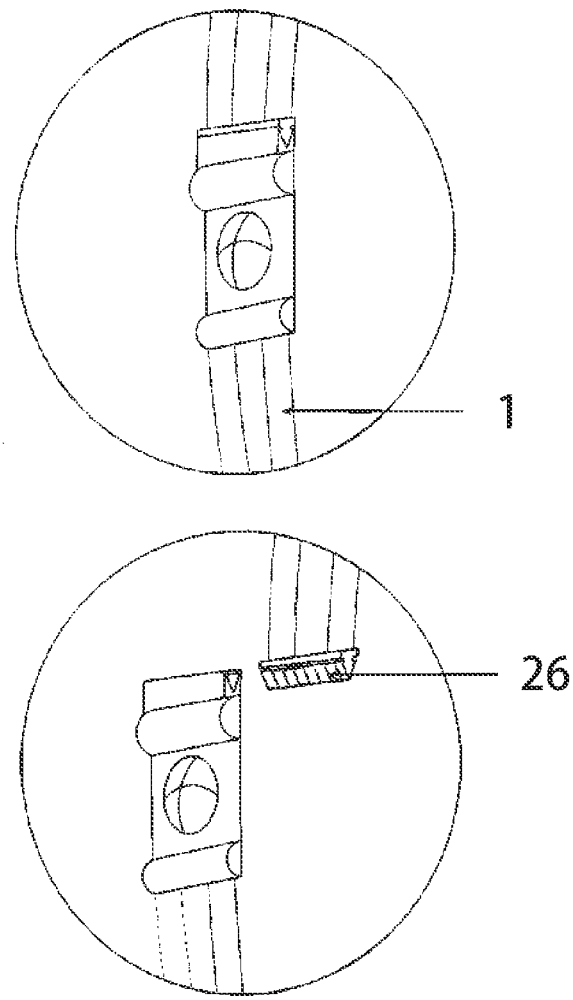
FIG. 17 shows an embodiment of a neck-wearable housing connector according to the invention.

A neck-wearable housing 1 (FIG. 17) may have at least two slots 26 for connecting additional sections of the neck loop.

Figure 19:
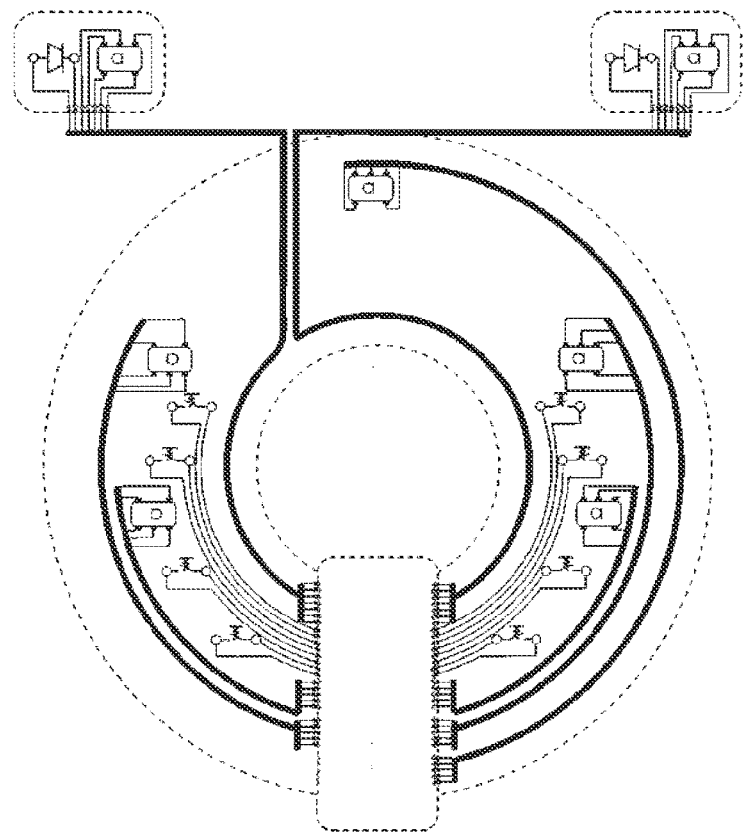
FIG. 19 and FIG. 20 show illustrative circuitry of a headset embodiment according to the invention.
Figure 20:
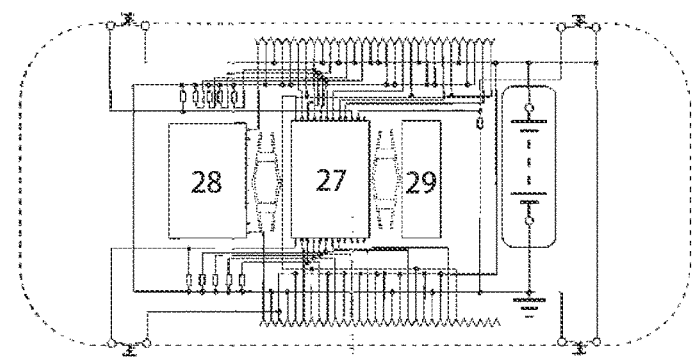

FIGS. 19, 20 show a connection circuitry of keys and microphones in one embodiment of the headset. This embodiment includes twelve keys and seven microphones.

Data outputs to contact members, sync signal inputs of the microphones and control keys are connected to inputs of a signal processor or controller 27 (FIG. 20). Earphones are connected to a control chip, CODEC 28, or an audio module, which comprises a digital-to-analog converter, and a controllable-gain amplifier. In operation, the processor data exchanges data with peripheral devices 29 as well. FIG. 19 shows electrical circuitry of the headset.

Unlike known stereo Bluetooth headsets, the electronic necklace in the form of an open or a closed loop can be controlled directly through the clothes, with no necessity of pulling it from a pocket of a bag or drawing it from under the clothes.

The headset may also comprise gyroscopes, accelerometers, magnetometers or other position sensors to assist in navigation with voice prompts of GPS device.

Benefits of the invention including: shortening by more than two times the length of the movable parts of cords, i.e., the portions between the nodes; convenient position and tension of cords on surface of the body; and immobility of the remaining cord portions allow the headset to be worn under clothes in the operational and non-operational position, and throat microphones may be disposed thereon.

In many embodiments the headset can be controlled without taking it from under the clothes or pulling a phone from a pocket, because the buttons located under clothes can be pressed from outside, over clothes, or by giving voice commands without hand manipulations at all. Direct contact between the device and the user's skin allows positioning on the headset sensors for monitoring the state of user's health, such as temperature, blood pressure, sugar, alcohol in skin secretions, etc., to monitor galvanic skin response for the purpose of control of the sympathetic nervous system, which allows using the headset as a part of a biotelemetry system for medical diagnostics.

The headset can be used not only as an option for connecting to a mobile phone or itself used as a mobile phone, but also as a component of a wearable mobile system with hardware distributed over several devices carried by a person, for example, some of hardware and battery base can be accommodated in a man's trouser belt, while the wired connection to the headset can be implemented in a cord, which lies under the clothes along the user's spine on the back; the headset itself can implement functionality of a mobile phone or smartphone, while a separately worn screen/keyboard unit can be used as a wireless interface to the mobile phone or smartphone.

The headset design comprising a suboccipital cord connection node and a short, as compared to the other neck headsets, section of the movable portion of cords connecting the headset with the neck-worn housing allows wearing the headset under user's clothes, thereby eliminating the use of external microphone close to the user's mouth. This leads to the need to provide a special arrangement topology of microphones in the headset and a hardware/software system for processing signals from microphones.

The problem of noise reduction in speech signals became even more pressing as the wearable devices may be used in a very noisy environment.

Figure 21A:
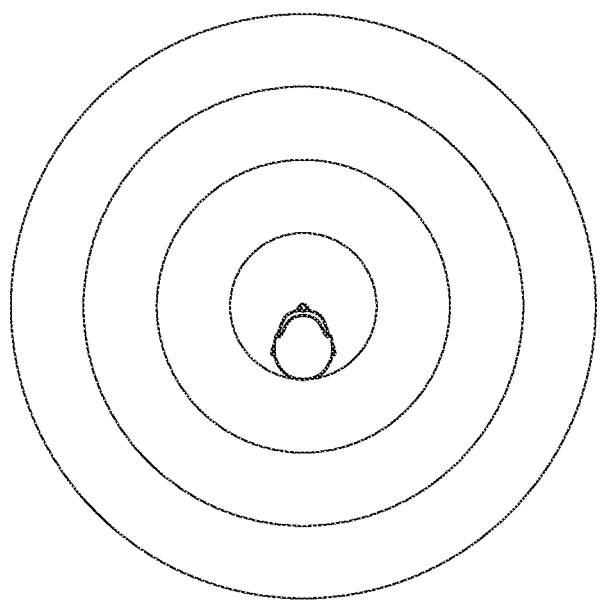
FIG. 21A illustrates ideal propagation of a spherical acoustic wave front when a user speaks.

Speech of a human being is a mix of tones with a lot of harmonic components and various noises, which mix very fast changes in time. The most representative frequency range of the human speech is 250 to 3000 Hz. The wave front of the sound is commonly spherical with the center of the sphere located at the speaker's mouth (FIG. 21A). The waves tend to propagate in all directions; however the real propagation model depends on the acoustic environment and the diffraction and interference pattern which in turn depends on the wavelength.

Figure 21B:
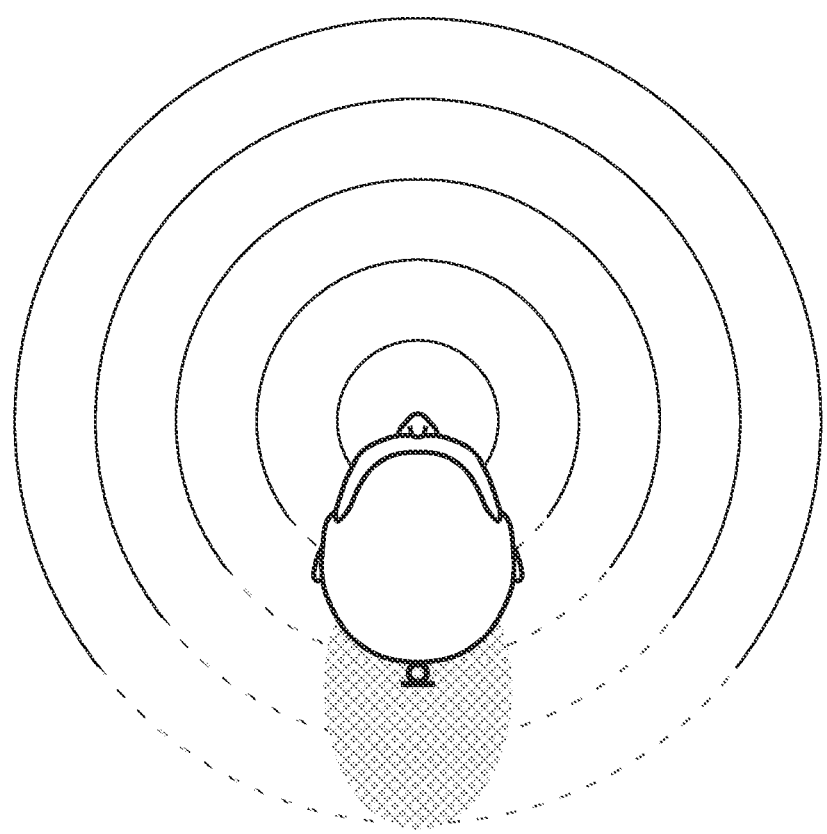
FIG. 21B illustrates real propagation of a spherical acoustic wave front, taking in account an acoustic shadow area behind the speaking user.

The waves corresponding to speech components over 2000 Hz are almost unable to pass around the human head (which dimension is about 21 cm), so a so-called "acoustic shadow" is formed in the area of the occipital surface and the dorsal neck surface of the user (FIG. 21B). Lower frequency sounds below 340 Hz having the wavelength of 1 m and more are able to pass around the human head and reach the occiput area at the cost of some amplitude decrease.

Figure 22A:
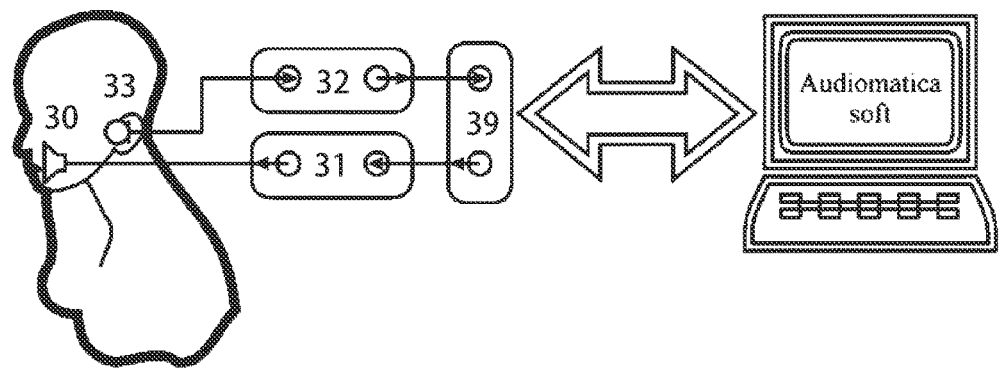
FIG. 22A, FIG. 22B and FIG. 22C illustrate equipment connection diagram and disposition of microphones used for experimental measurements of the invention prototypes.
Figure 22B:
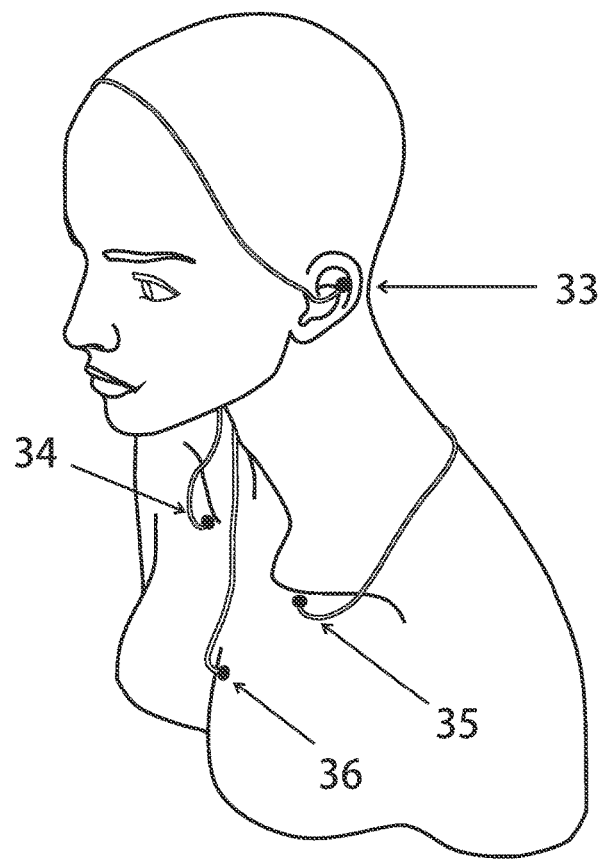
Figure 22C:
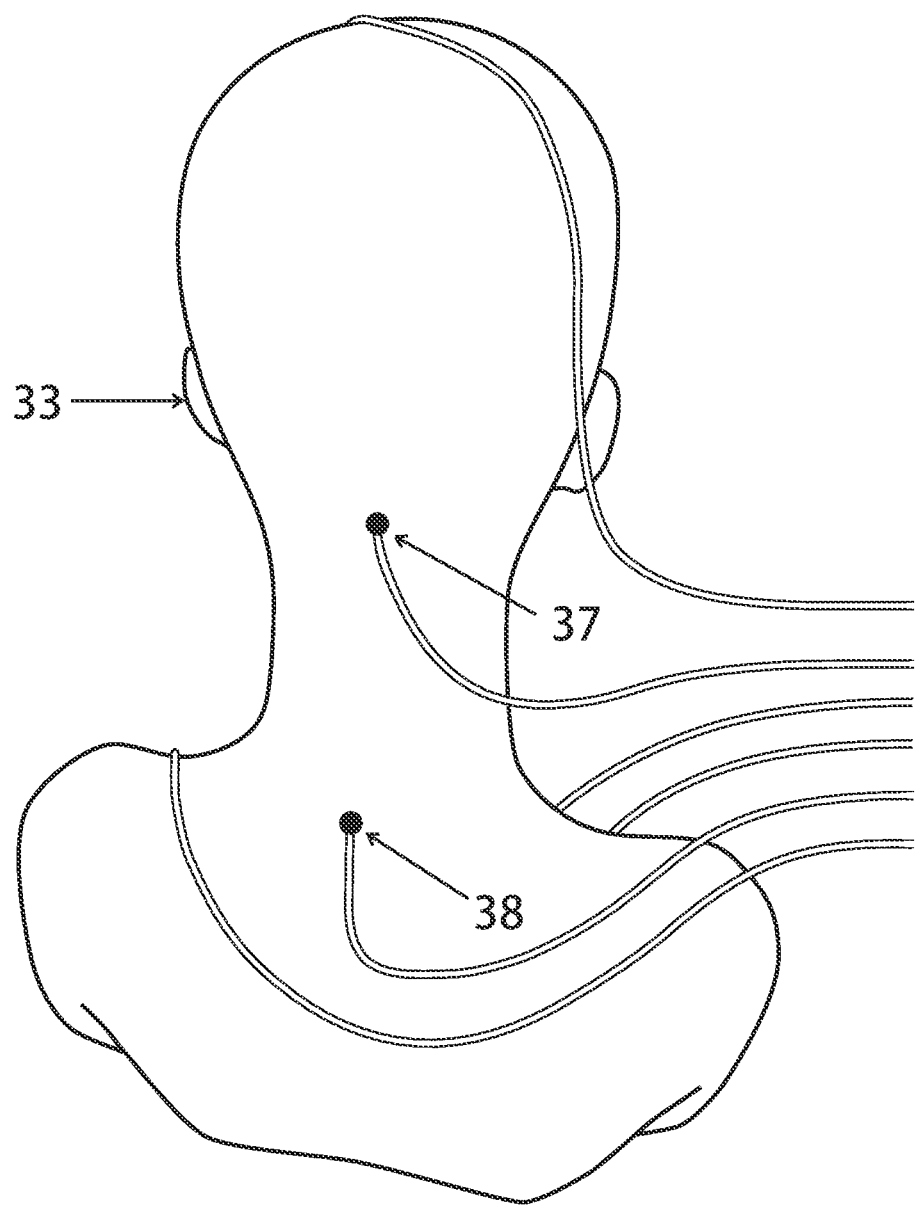

An anthropometric dummy was used in the acoustic field research performed by the inventor. FIG. 22A illustrates equipment connection diagram, where the test setup comprises an artificial voice unit 30 (Bruel & Kjaer, type 4128) connected to a power amplifier 31 (Bruel & Kjaer, type 2636), a number of microelectromechanical system (MEMS) microphones 33-38 (Knowles, type SPH1642HT5H-1) connected to a preamplifier 32 (Bruel & Kjaer, type 1054), and a measurement unit 2 (Audiomatica, CLIO) connected to a computer. FIG. 22B and FIG. 22C illustrate disposition of the microphones on the dummy's surface.

A variable frequency sinusoidal signal was supplied from the measurement unit 39 via the power amplifier 31 to the artificial voice unit 30. The microphones 33-38 were alternately connected to the measurement unit 39 via the preamplifier 32. A quiet room was used for the measurements and a gain-frequency characteristic and a gain-phase characteristic were determined for each of the microphones.

Irregularity of the obtained gain-frequency characteristics is mostly caused by frequency features of the artificial voice unit. As relative characteristics measured in the target points were in the experiment focus, the irregularity may be neglected. The front microphone 36 was used as a main microphone, and an additional reference microphone (not shown in the figures) disposed in front of the dummy's mouth was used in order to determine the relative characteristics of the microphones 33-38.

The experiments yielded the following results (FIG. 23A, FIG. 23B):
 the directional diagram of the artificial voice unit 30 was found mostly even in the frequency range below 2 kHz and substantially uneven in the frequency range above 2 kHz, while the most sharp unevenness was found in the region of 10 kHz and more;
 the most difference (20 dB) in the frequency range above 2 kHz was found between the gain-frequency characteristics of the main microphone 36 centrally positioned on the dummy's chest and the rear microphones 37, 38;
 a moderate difference of 5 to 10 dB in the frequency range above 2 kHz was found between the gain-frequency characteristics of the microphone 33 positioned near the dummy's auricles and the rear microphones 37, 38.

It is known that increasing signal-to-noise ratio (SNR) just by 1 dB is able to improve the speech intelligibility, which is usually evident to experts during experiments and being beyond possible experimental error range.

Thus, the main microphone 36 positioned on the dummy's chest provides maximum level of a speech signal comparable with the reference microphone level, while the microphones 37, 38 positioned on the dummy's occiput or dorsal neck area provides minimal level of the speech signal in the frequency range above 2 kHz. This frequency range is particularly important for correct transmission of the speech via communications channels, as harmonic components providing the voice personalization mostly occupy the range over 1.7 kHz. Therefore, a pair of microphones, one of which is located on the user's chest and the other one is located on the back part of the user's neck, may be used for separation of the target speech signal.

This is apparent from the above data, that positioning a microphone in close vicinity of the user's auricle (like the microphone 33), provides substantially less speech amplitude difference between this side microphone and the front microphone (like the main microphone 36), than the difference between a rear microphone (like the microphones 37, 38) and the same front microphone.

Most of the above-mentioned conventional solutions use a front microphone located close to the user's mouth (like a boom microphone), so the speech amplitude difference is greater than indicated in the above experimental data. However, when a microphone is aggregated with an earphone, some special solutions for preventing acoustic feedback between the microphone and the earphone have to be used, which makes the digital signal processing algorithm for noise reduction more complicated and less efficient.

Therefore, the inventor worked on finding an optimal number and layout of microphones applicable to a neck-worn hands-free device and selecting the best processing method for noise reduction.

Different noise reduction systems are used for increasing SNR of speech signals. The general principle of these systems is determination of a noise estimation for a source additive signal by mathematical methods, and further subtraction of the noise estimation from the additive signal. Functions of noise reduction algorithms applicable to a microphone array are shown in FIG. 24A and FIG. 24B, wherein dedicated microphones for receiving noise are used.

Figure 24A:
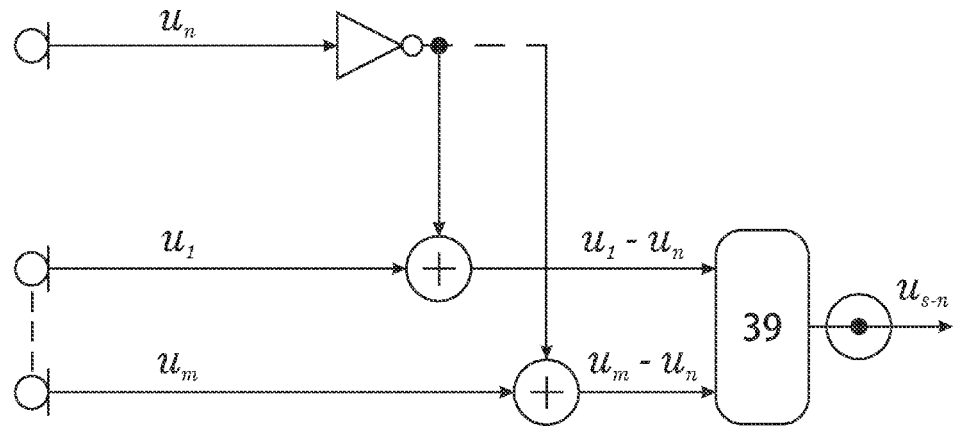
FIG. 24A shows a schematic diagram illustrating noise canceling in low frequency signals, according to the invention.

One possible method is illustrated by FIG. 24A, wherein the noise signal $u_n$ obtained from a dedicated noise microphone is subtracted from signals $u_1 \ldots u_m$ obtained from another microphones located in the area of direct propagation of a speech sound wave. Further, the output signal $u_{s-n}$ is formed by the unit 39 from the subtraction results.

Figure 24B:
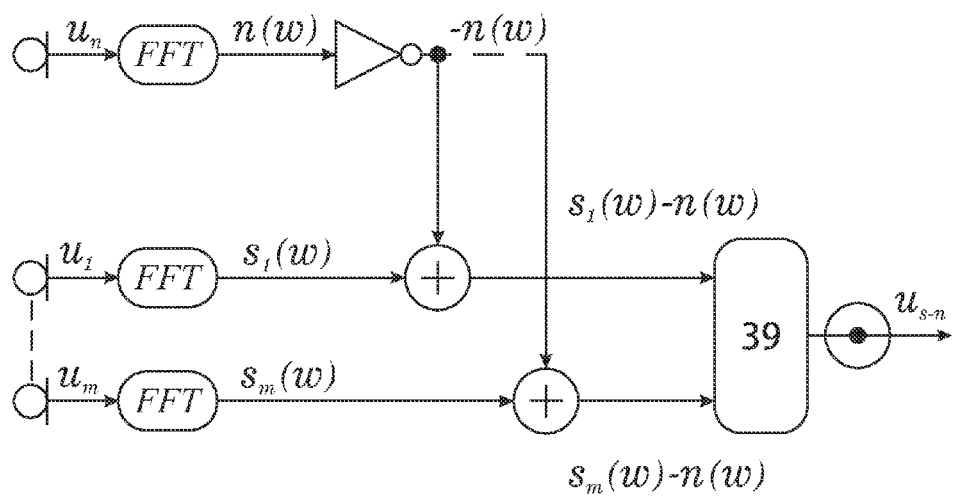
FIG. 24B and FIG. 24C show schematic diagrams illustrating noise canceling in high frequency signals, according to the invention.

In another method illustrated by FIG. 24B, spectrum-sensitive subtraction is performed, which takes into account the phase difference of the microphones, which difference is significant for high frequency signals. In this method, signals of all of the microphones are Fourier-transformed, afterwards the noise amplitude n is subtracted from signal amplitudes $s_1, \ldots s_m$ and the output signal $u_{s-n}$ is formed by the unit 39 from the subtraction results. The algorithm implies dividing the working bandwidth into a number of sub-bands and using individual weight factors for the noise signal $u_n$ and for the processed signals $u_1 \ldots u_m$ in each sub-band in order to form the output signal $u_{s-n}$. Different embodiments of this method may be done like those disclosed in references [6], [7]. For instance, Fast Fourier Transformation (FFT) and correlation matrices may be used, like in a Wiener filter.

The above methods are applicable when the microphones are located in the area of direct sound wave propagation, i.e., in an area where the wave front is ideally spherical.

Figure 24C:
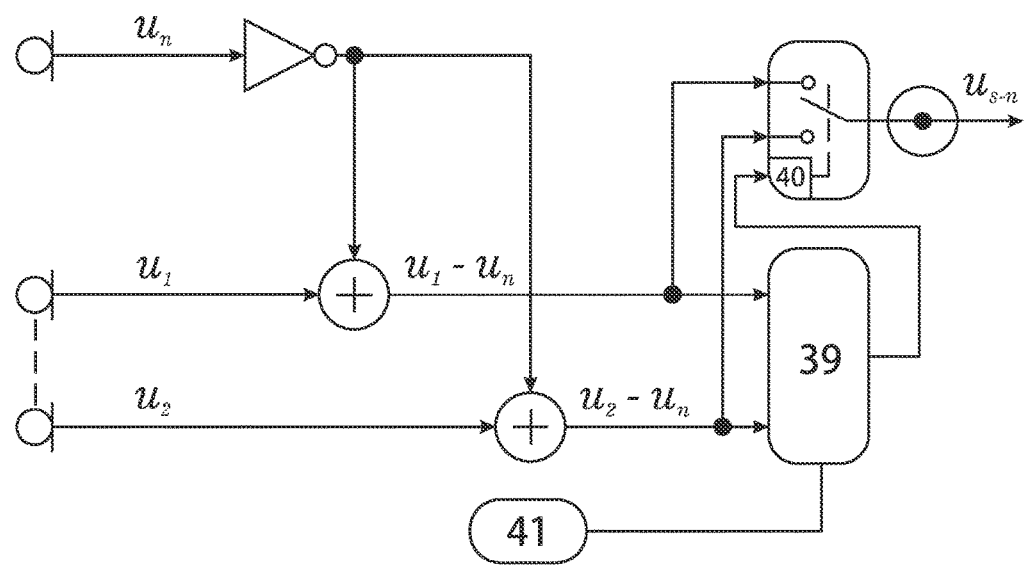

FIG. 24C shows a simplified embodiment of the method of FIG. 24B, wherein one of two front microphones is used as a noise microphone, and the other one is used as a main microphone. The unit 39 selects the best microphone and controls the switch 40, where the target signal level of the best microphone is higher by a predetermined threshold 41.

The noise sources are usually distantly located so the distance between them and the microphones is far greater than the sound wavelength. Therefore, the acoustic pressure S in the wave is fairly defined by the spherical wave formula:

$$s = \frac{A\exp(-ik_s(r - vt))}{r^2}, \qquad (37)$$

where A is the oscillation amplitude of the source, $k_s$ is the wave vector, v is the wave speed, r is the sphere radius, t is the time of propagation.

It can be seen from the above expression that if the user's head dimensions are substantially less than the distance r, the wave may be considered flat and the amplitude may be considered constant. In this case, the noise signal amplitude is about the same for each of the microphones disposed in a neck-worn device. Moreover, in a room, the noise sound waves may be highly reverberated so the noise sound wave front may be gravely distorted. This means that the noise signal level of all the microphones is substantially equal, no matters which side a microphone is directed to. So it may be enough to simply subtract the signal of the rear microphone used as a noise microphone from the signal of the front microphone used as a main microphone. If a microphone array is used, the subtraction may be performed for signals $u_1 \ldots u_m$ obtained from all microphones except for the noise microphone (FIG. 24A).

However, such a simple subtraction method does not take in account the phase incursion between the noise microphone and the other microphones. This difference may be substantial for high frequencies, when the distance between the microphones is comparable to the sound wavelength. In this case, the spectrum-sensitive subtraction may be used as shown in FIG. 24B.

When possible, one or several front microphones may be positioned in a device worn on the user's head (like a helmet, glasses, massive headphones, etc.). If not, it is expedient to locate a front microphone in a wearable neckband, so that the microphone is positioned in the area of the joining point of clavicle and episternum. A couple of front microphones (a left front microphone and a right front microphone) located on the user's chest can be used in order to compensate the user's head rotation during the talk. In particular, signal phase and amplitude differences tend to occur due to the user's head tilt and rotation, as the distance between the user's mouth and the front microphones continuously varies and a kind of a comb filter is formed.

A microphone signal adder may be used for forming a single front sound signal by addition of the signals obtained from the front microphones. Additionally, a dynamic range compressor (DRC) may be used for reducing the excessively wide dynamic range. These solutions have been described in the prior art, so their details are omitted for the sake of brevity. It just shall be noted that these solutions are quite rarely used in wearable devices, as they require a hardware having substantial dimensions, weight and power consumption, whereas the necklace form-factor easily allows using such solutions.

The controlled switch solution of FIG. 24C is also applicable for selecting one of the two front microphones, depending on which side the user's head is rotated and/or tilted is. Preferably, directional microphones may be used as the front microphones, wherein the directional diagram of each microphone is headed up to the user's mouth. A dedicated phased microphone array or a gradient microphone array may be used instead of the directional microphones, which may be e.g., a couple of front microphones positioned on the central line, comprising an upper microphone placed closer to the user's mouth and a lower microphone placed farther to the user's mouth).

The microphones shall be relatively fixed on the wearable device. A Bowden cable may be used for connecting members of the wearable device in order to prevent twisting thereof and flipping over the microphones. Rustle in the microphones may be reduced (not eliminated though) by using very smooth cases for the wearable device members and by noise insulation of the microphones within the cases. The microphone holes shall be placed in those faces of the wearable device members, which do not normally contact the user's clothes.

The position of the noise microphone is stipulated by the pattern of acoustic field formed during the user's speech. In particular, the speech wave level is expected to be substantially lower near the back side of the user's neck (FIG. 21B) due to diffraction effect and the wave is expected to be delayed. This assumption is confirmed by the above-mentioned experimental data.

Figure 23A:
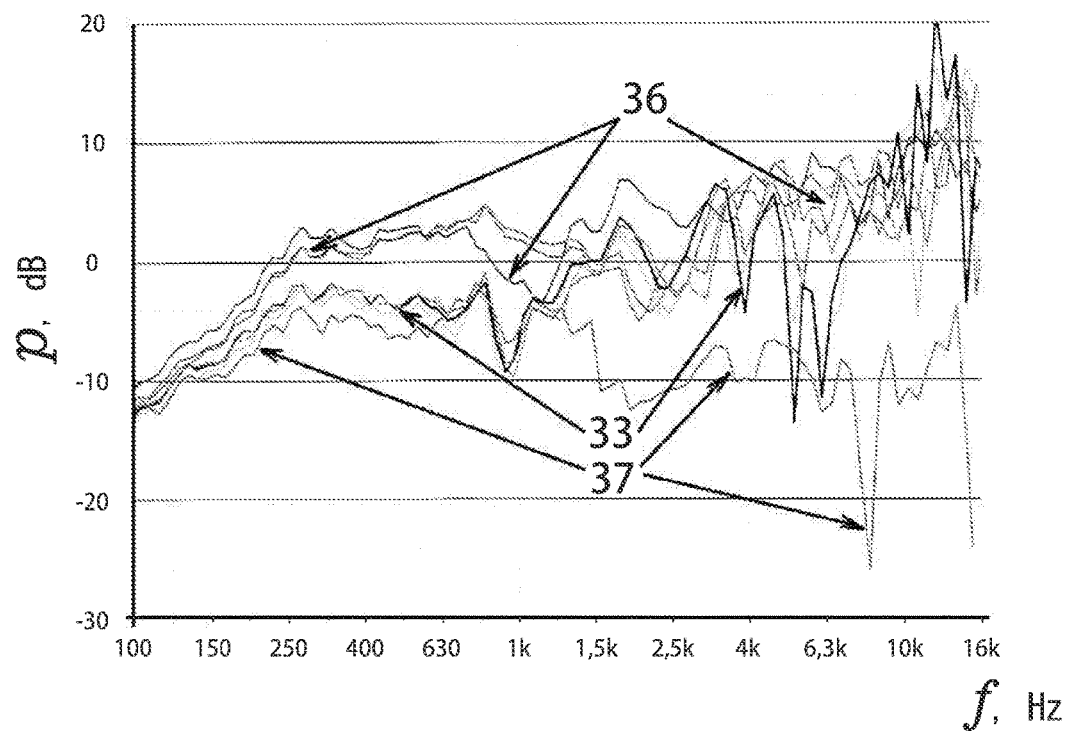
FIG. 23A shows the difference between amplitude-frequency response curves of microphones placed on the chest, in the auricle, and on the dorsal neck surface of a user.

Moreover, as can be seen in FIG. 23A, the gain-frequency characteristics are non-monotonic. This may occur due to acoustic wave interference and/or resonance effects in the sound source and the environment. However, as the general pattern of the gain-frequency characteristics is substantially the same, unevenness of the characteristics may be neglected and the signal level differences of different microphones may be considered. In particular, using the microphones 37, 38 as the rear microphones is preferable, because the microphones 37, 38 provide less level of the user's speech signal than the microphone 33 and facilitate more distinct separation of the environmental noise signal.

In order to more clearly define the impact of the acoustic wave diffraction, the phase-frequency characteristics of the microphones shall be analyzed. The phase difference of sound oscillations for two microphones is the product of the wave vector $k_s$ and the distance l between the microphones:

$$\Delta\phi = k_s l \quad (38).$$

If the acoustic wave interference is neglected, then the acoustic wave dispersion principle is:

$$\omega = v k_s \quad (39),$$

where v is the wave speed. Combination of (38) and (39) yields the expression for the phase difference:

$$\Delta\phi = \omega l / v \quad (40).$$

Figure 23B:
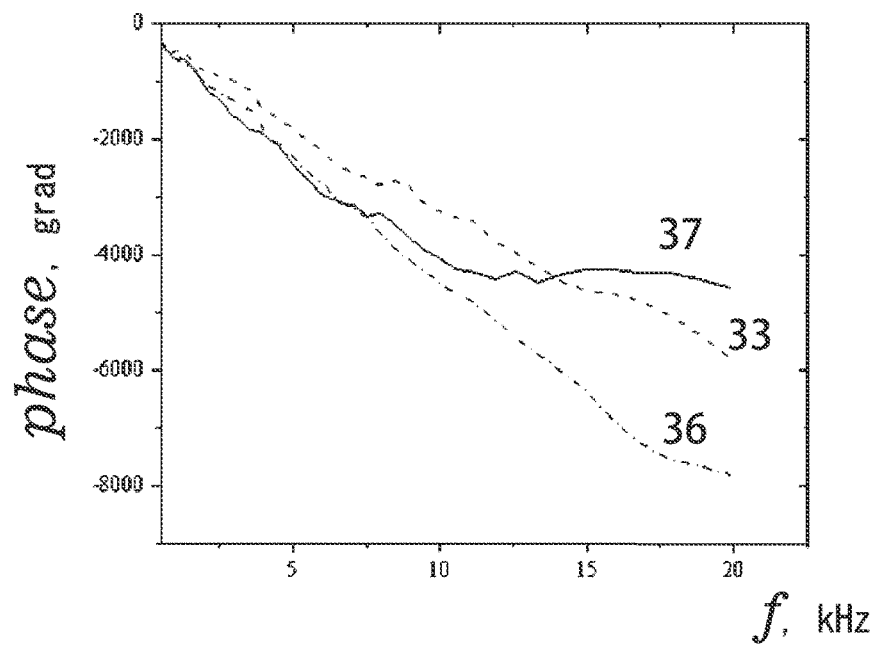
FIG. 23B shows the difference between phase-frequency response curves of microphones placed on the chest, in the auricle, and on the dorsal neck surface of a user.

Thus, a linear dependence for the phase difference of sound oscillations for two microphones can be expected with the above assumptions applicable for low frequency. However, these assumptions are generally not valid in the frequency range over 2 kHz. This is illustrated in FIG. 23B, where the phase-frequency characteristic of the main front microphone 36 is nearly linear, while the phase-frequency characteristic of the rear microphone 37, 38 is substantially non-linear, and the linearity measure of the phase-frequency characteristic of the side microphone 33 is intermediate. Linearity of the phase-frequency characteristic may be defined as the dependence of the acoustic path on the frequency $l(\omega)$. This dependence may be caused by the curving the sound wave front due to diffraction on the user's head.

To sum up, the analysis results show the following:
(a) the microphones 34, 35, 36 provide maximum SNR in the frequency range below approximately 1.5 kHz and they are optimal for use as the main microphones;
(b) the microphones 37, 38 provide minimal SNR in the frequency range over approximately 1.5 kHz and they are optimal for use as the noise microphones;
(c) the microphones 33 provide intermediate SNR in the frequency range over approximately 1.5 kHz and they are not optimal for use as the noise microphones.

This means that when speech information is received with no background noise, the microphones 34-36 provide the best quality of the target signal. The microphones 37, 38 provide the target signal with substantially depressed level and shifted phase in the frequency range over approximately 1.5 kHz, comparatively to the microphones 34-36.

When diffused noise is received from a distant source and/or when the noise is received in a room where reflections occur, the levels of the noise signal obtained from each of the microphones are approximately equal. In other words, by placing the noise microphone on the back part of the user's neck, it is possible to obtain a signal having minimal content of the diffracted speech sound and about the same noise content as the main microphone. This facilitates further processing the signal and separating the noise content in order to provide desired SNR of the target signal.

Figure 25:
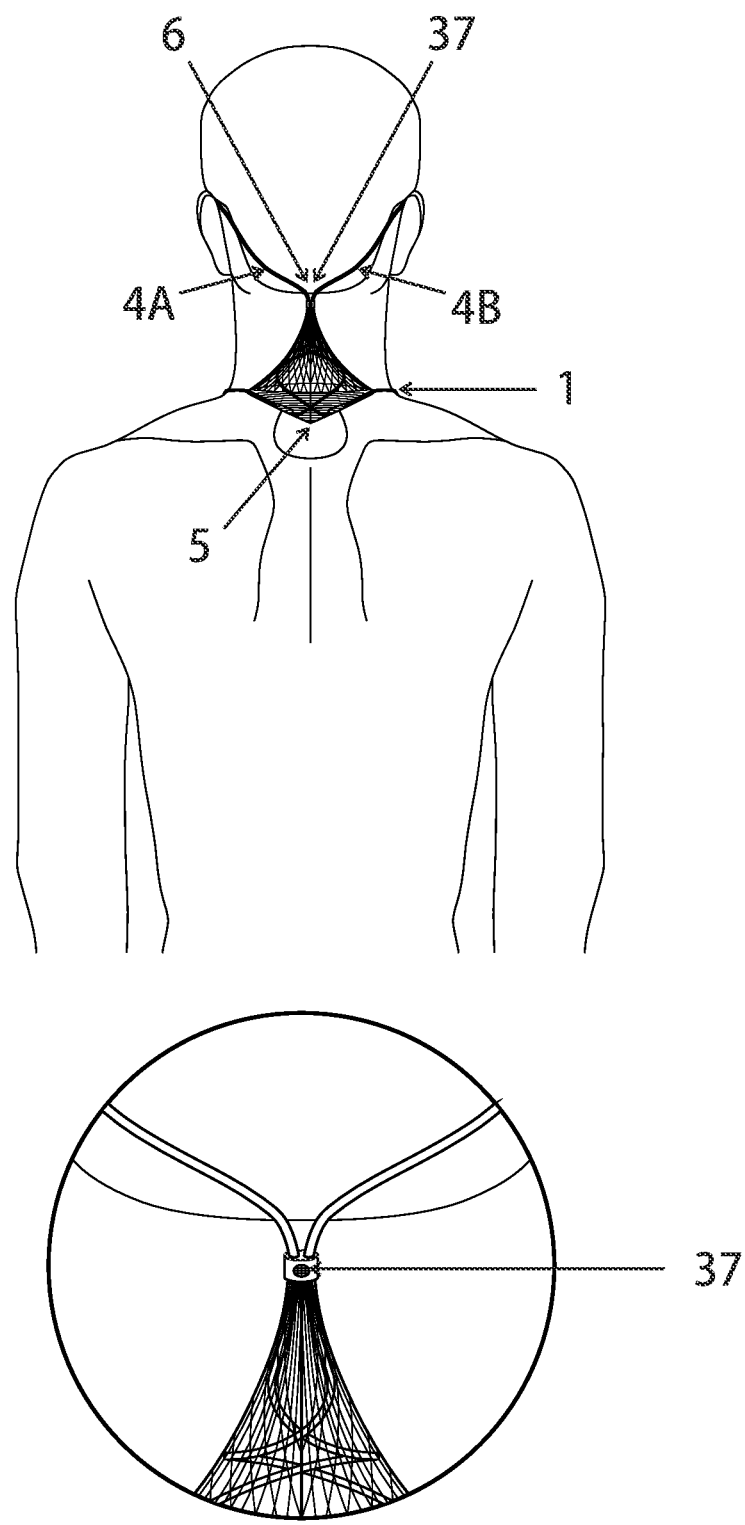
FIG. 25 shows the position of a rear microphone placed in the suboccipital node of a wearable device according to the invention.

FIG. 15 and FIG. 25 shows a wearable telecommunication device, comprising a neck-wearable housing 1 with an electronic unit 9 attached thereto, two in-ear earphones, two cords 4A, 4B, one of which connects to one of the in-ear earphone to the electronic unit, and the other cord connects the other in-ear earphone to the electronic unit; and a microphone array for picking up and processing a user's voice, the microphone array comprising a front microphone 25, a rear microphone 37 and a processor, wherein the two cords are mechanically connected to the neck-wearable housing, and points of connection of the two cords to the neck-wearable housing are close to each other and form a dorsal cord connection node 5, and are further mechanically connected to each other in sections between the in-ear earphones and the dorsal cord connection node 6 to form a connection point, wherein the suboccipital cord connection node, the dorsal cord connection node, and an area of the housing close to the dorsal cord connection node form a rear portion of the wearable telecommunication device, wherein the rear microphone 37 is fixed on the rear portion; and wherein a front-facing portion of the neck-wearable housing is in contact with an upper chest when worn by the user.

When the rear microphone 37 is a part of a microphone array, the rear microphone signal may be used in processing a front microphone signal. In particular, the noise signal may be estimated and the estimation may be subtracted from the front microphone signal by means of direct subtraction or spectrum-dependent subtraction as shown in FIG. 24A and FIG. 24B. Further the target signal may be processed by an active noise reduction (ANR) system which mathematically determines residual noise estimation and subtracts it from the target signal in order to additionally increase the SNR of the target signal.

Figure 26A:
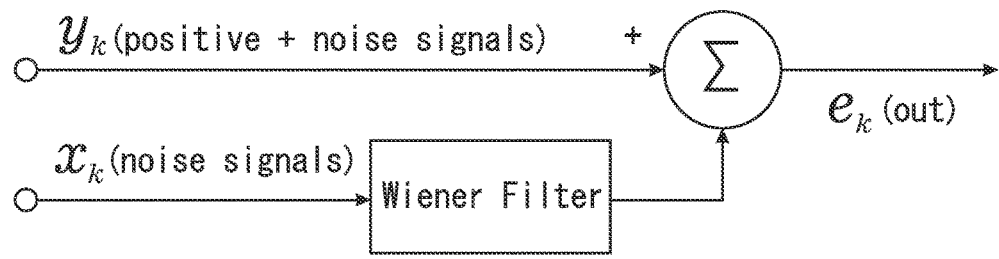
FIG. 26A shows a schematic diagram of a Wiener adaptive filter according to the invention.

Generally, most of optimal filters applicable for the above-indicated task may be considered as instances of the Wiener filter (FIG. 26A). Two signals, $x_k$ and $y_k$ are simultaneously supplied to the filter inputs. The $y_k$ signal usually contains two signal components, one component correlating with the $x_k$ signal, and another component non-correlating with the $x_k$ signal. The Wiener filter allows optimal estimation of the $y_k$ signal component correlating with the $x_k$ signal, and forming an error signal by subtracting the estimation from the $y_k$ signal.

An optimal finite impulse response (FIR) filter able to minimize a root-mean-square error may be defined based on the autocorrelation function of a reference signal and the cross-correlation function of the reference signal and the processed signal. Practically, the autocorrelation and cross-correlation functions are defined based on the previous samples of the corresponding signals, so a large amount of data is required for precisely calculating the estimation value.

Another approach for defining the filter tap weight factors is using adaptive algorithms. Instead of forming a data set for defining the correlation functions and using these functions for calculating each single tap weight vector for approximation of the optimal Wiener filter, the data is sequentially used for adjusting the filter tap weights in the direction of the gradient minimizing the root-mean-square error. Generally, the filter tap weights are adjusted in response for every data set, so this method requires substantially less adaptation calculations for each sample, in comparison with optimal algorithms. Like an optimal filter in case of a stationary signal, an adaptive filter automatically adjusts the filter tap weights upon drifting correlation functions of the input signals. An adaptive filter is able to track statistical parameters of non-stationary signals, if the parameters change rate is slower than the convergence rate of the adaptive filter.

The most commonly used adaptation algorithm for FIR filters uses a quadratic error surface for such filters. When the filter tap weights change by a low value, being inversely proportional to the local gradient of the filter tap weight objective function, then the tap weights tend to shift to the global minimum position of the error surface.

The Widrow-Hoff Algorithm has proposed tap weight adaptation method for each sample, by using an instant gradient assumption (this method sometimes is referred to as a stochastic gradient method), instead of slow filter adjustment using an average gradient assumption, which may also be used in the invention.

Figure 26B:
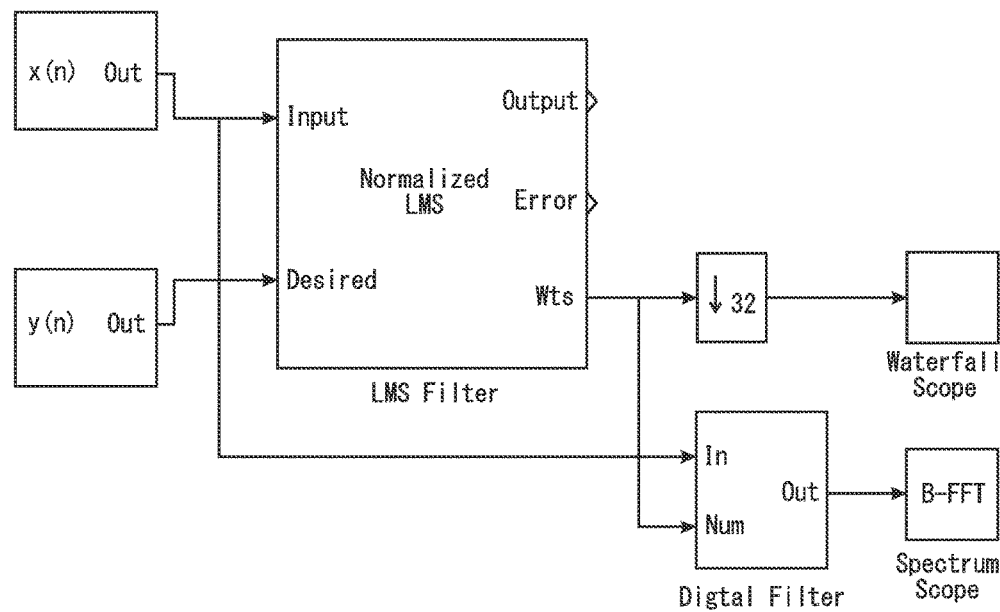
FIG. 26B shows a schematic diagram of a least-mean-square method filter according to the invention.

The adaptive algorithm may be defined as follows:

$$w(n+1)=w(n)+\mu x(n)e(n) \qquad (41),$$

where w is the adaptive filter tap weight, n is the step number, $\mu$ is the filter convergence factor defining stability and the convergence rate of the filter. This algorithm is knows as the least-mean-square (LMS) algorithm. The LMS algorithm is simple, numerically stable and it is widely used in various adaptive systems. The diagram in FIG. 26B illustrates possible embodiment of the LMS algorithm in a filter, where the product of multiplication of the error signal and the reference signal is used for adaptation of the filter tap weights.

The main advantage of the LMS algorithm is its ultimate calculation simplicity, as just N+1 pairs of multiplication-addition actions shall be performed in each step for adjusting the filter tap weights. The reverse side of the simplicity is slow convergence and comparatively high error dispersion in the steady state, as the filter tap weights always fluctuate around optimal values, thus increasing the output noise.

Applicability of a certain algorithm depends on numerous factors and shall be defined individually in each case, based on experimental data. For instance, when an adaptive algorithm like the LMS algorithm is used, extraction of the input signal components being correlated and non-correlated to each other is performed in the real-time mode. It is obvious that when the above-stated microphone layout comprising a front microphone and a rear microphone is used, all components in the frequency range below 1.7 kHz will be suppressed. The non-correlation degree of the front and rear microphone signals increases almost proportionally as the frequency rises in the range above 1.7 kHz, so the efficiency of the target signal detection increases correspondingly.

There are numerous LMS algorithm modifications aimed at increase of the convergence rate or at decrease of the number of necessary calculations. The convergence rate increase may be attained by improvement of the gradient assumption as well as by transformation of the input signal so as to make its samples non-correlated. Decreasing the calculation complexity may be achieved, e.g., by using signs of the error signal and the time-delay line content instead of their values. This approach allows getting rid of multiplication operations while updating the filter tap weights.

Loss of the target signal in the frequency range below 1.7 kHz may be compensated by digital filtration methods. However, the SNR of harmonic voice components will be worse in this case.

Further improvement of the noise reduction system is introducing a third front microphone placed in a neck-worn device and located on the user's chest. This approach allows forming a full-size microphone array which provides solutions for a number of problems, e.g., dynamic forming the array directional diagram depending on the user's head rotation and increasing quality of the speech signal owing to widening the array aperture.

Figure 27:
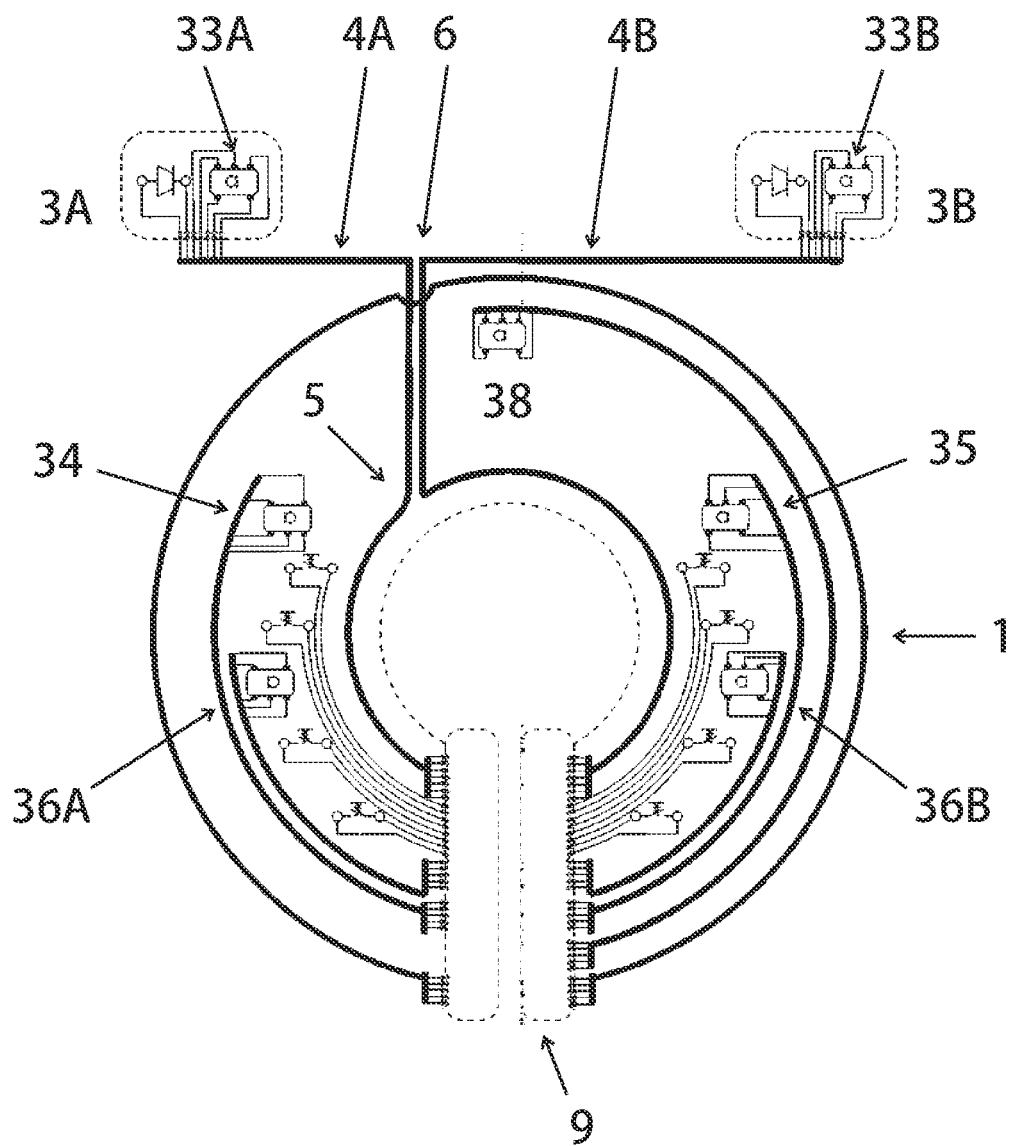
FIG. 27 shows a connection diagram of a microphone array comprising a rear microphone, in one embodiment of the invention.
Figure 28:
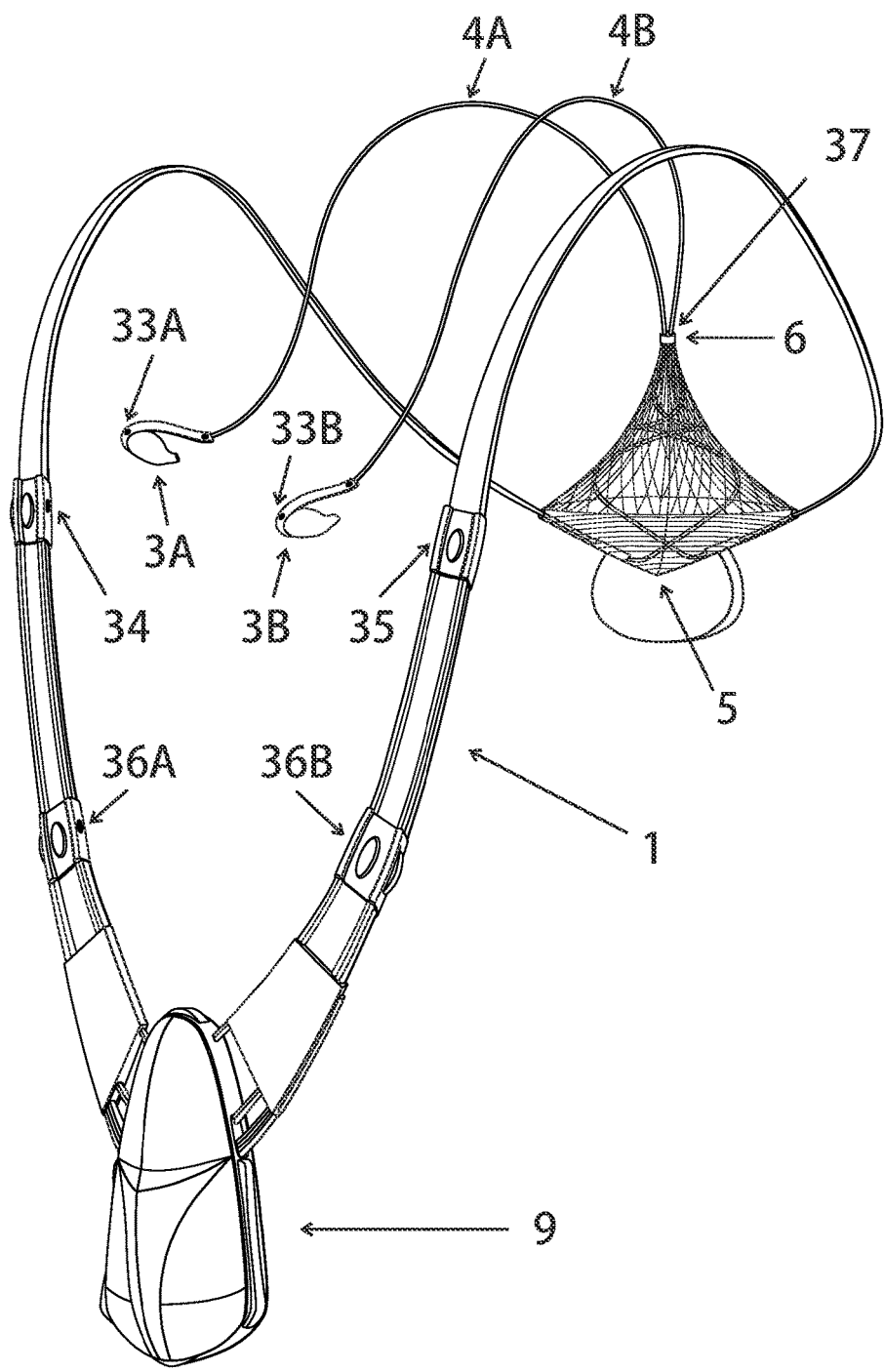
FIG. 28 illustrates positions of microphones of a microphone array comprising a rear microphone, in one embodiment of the invention.

FIG. 27 and FIG. 28 show an embodiment of the invention in a form of a wearable telecommunication device, comprising a neck-wearable housing 1 configured to be mounted on a human body and in contact with back, left, right sides of the neck and upper chest and having at least one electronic unit 9 attached thereto, two in-ear earphones 3A, 3B, two cords 4A, 4B, one of which connects to one of the in-ear earphone to the electronic unit, and the other cord connects the other in-ear earphone to the electronic unit, a microphone array for picking up and processing a user's voice, comprising a front microphone 34, a rear microphone 38 and processor, where the two cords are mechanically connected to the neck-wearable housing and points of connection of the two cords to the neck-wearable housing are close to each other and form a dorsal cord connection node 5, and are further mechanically connected to each other in sections between the in-ear earphones and the dorsal cord connection node to form a suboccipital cord connection node 6 at the connection point, where the rear microphone 34 is on a portion of the neck-wearable housing configured to be in contact with a back of the neck when worn by the user; and where a correlated portion of the signal from the rear microphone and the signal from the front microphones represents noise, while an uncorrelated portion of the signal represents useful data.

The rear microphone may be fixed on the suboccipital cord connection node (37 on FIGS. 28, 29A), on the neck-wearable housing close to the dorsal cord connection node (38 on FIG. 29A), and between the suboccipital cord connection node and the dorsal cord connection node. The front microphone 25 is fixed on a portion of the neck-wearable housing that is in contact with the user's chest when worn by the user (FIG. 15).

Figure 29A:
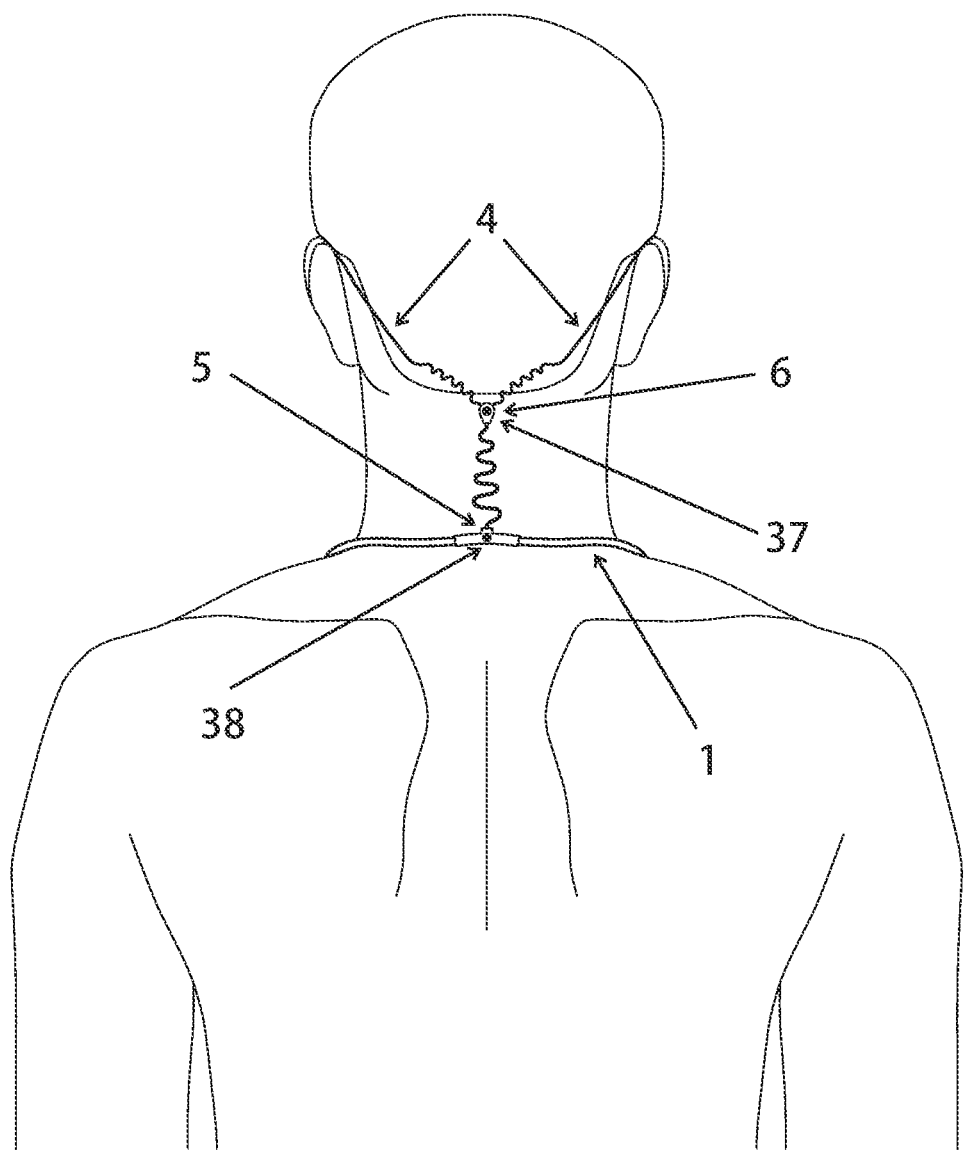
FIG. 29A illustrates possible positions of a rear microphone on the user's body in one embodiment of the invention.
Figure 29B:
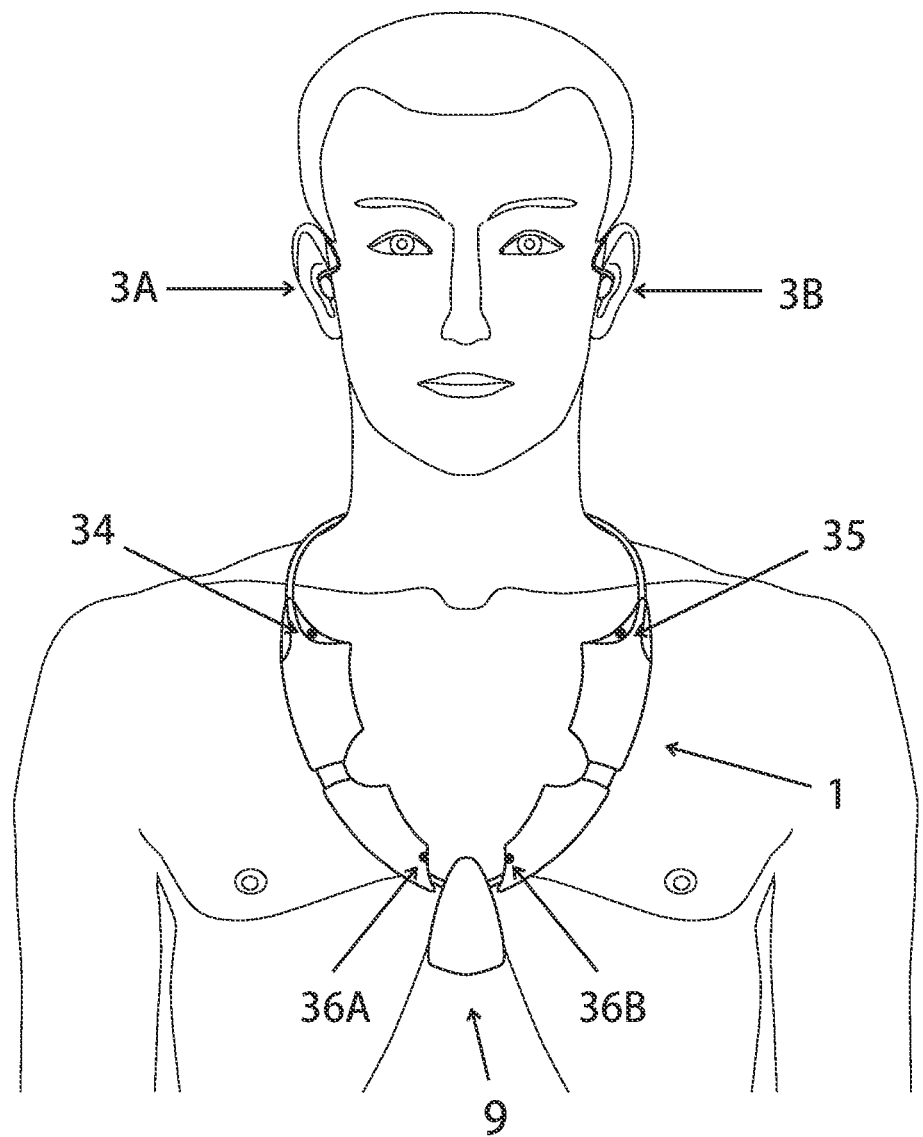
FIG. 29B illustrates possible positions of front microphones on the user's body in one embodiment of the invention.

In some embodiments (FIG. 29B) the wearable device comprises two front microphones 36A, 36B wherein the two front microphones are fixed on a portion of the neck-wearable housing that is in contact with the user's chest and at a substantially the same height when worn by the user. In particular, the front microphone 36B is positioned on the left side of the user's chest, the front microphone 36A is positioned on the right side of the user's chest. The rear microphone 38 is positioned in close proximity to the dorsal node (FIGS. 28, 29A, 29B).

This configuration allows implementation of an adaptive algorithm defining the correlated and non-correlated components of the signal separately for two pairs of microphones, front right—rear and front left—rear, which facilitates substantially increasing precision of the noise signal assumption and improving SNR of the target speech signal.

The device may further include a phased or a gradient microphone array comprising at least two microphones fixed on a chest portion of the neck-wearable housing, the additional microphone array may be used to determine a directional diagram of received sound waves.

Additionally, the target speech signal SNR may be improved by introducing one more microphone disposed below the pair of the front-right and front-left microphones so as to form a triangle (like shown in FIG. 22B), or by introducing two more microphones 34, 35 disposed below the pair of front-right and front-left microphones so as to form a tetragon (like shown in FIG. 29B). This configuration provides further improvement of the signal-to-noise ratio owing to an increase in the number of microphones in the array and possibly using more complicated adaptation algorithms, e.g., a phased sub-array or a gradient sub-array may be formed so as to determine the direction of the target sound and the direction of the noise sound.

FIG. 29A and FIG. 29B show an embodiment of the invention in a form of a wearable electronic device comprising a neck-wearable housing 1 with at least one electronic unit 9 attached thereto, two in-ear earphones 3A, 3B, two cords 4, and a microphone array comprising four front microphones 34, 35, 36A, 36B and two rear microphones 37, 38, where the front microphones 36A, 36B are positioned on a substantially horizontal line (the first line), the front microphones 34, 35 are positioned on another substantially horizontal line below the first line. The neck-wearable housing is configured so as the front microphones 34, 35 are disposed in close vicinity of the left and right clavicles, correspondingly.

The dorsal node 5 and the suboccipital node 6 comprise the two rear microphones 38, 37, correspondingly. The microphone array forms a number of signals further used for determination of the correlated and non-correlated components of the front and rear microphone signals, while the correlated components are considered as noise. The adaptive algorithms used for determination of the correlated and non-correlated components may be narrow-band algorithms or wide-band algorithms. The narrow-band adaptive algorithms are far simpler in implementation than the wide-band adaptive algorithms. Whether an algorithm shall be implemented as narrow-band or wide-band is determined based on the phase incursion between the microphones in a certain frequency range, see [8]:

$$\Delta \varphi = 2\pi \frac{\Delta Fs \cdot L}{c} \ll 1, \qquad (42)$$

where $\Delta Fs$ is the frequency range, L is the distance between the outermost microphones, c is the velocity of sound in the atmosphere (approximately 340 meters per second).

In the device under consideration, $\Delta Fs=Fmax-Fmin=3.1$ kHz, where $Fmax=3.4$ kHz is the highest signal frequency, $Fmin=300$ Hz is the lowest signal frequency, $L=0,2$ M is the distance between the outermost microphones, so the phase incursion $\Delta \varphi \approx 11.5$ and the condition (42) is not met. Therefore, wide-band adaptive algorithms shall be used in the device under consideration.

When the noise signal is adaptively suppressed, the target signal is somewhat attenuated as well, because the noise signal mainly differs from the target signal by the direction of incoming sound wave. If the direction of the target sound is known, then an adaptive Frost algorithm may be used, see [6], which limits attenuation of the target signal. When a front microphone is positioned on the user's head (like a boom microphone), the adaptive Frost algorithm may be used fairly easily. However, when one or more front microphones are placed in the device and positioned on the user's chest, the direction of incoming target sound may be determined very roughly within a rather wide angle range due to possible rotation of the user's head. Nevertheless, the adaptive Frost algorithm may be used if one of the front microphones is selected as the best one, based on the target signal volume.

Another approach is using a processed composite signal formed from several front microphones as the front signal in the adaptive Frost algorithm. One other approach is using one or more front microphones disposed in additional devices like glasses, watches, bracelets, rings, etc., where the front microphones are wirelessly connected to the wearable device.

Figure 30:
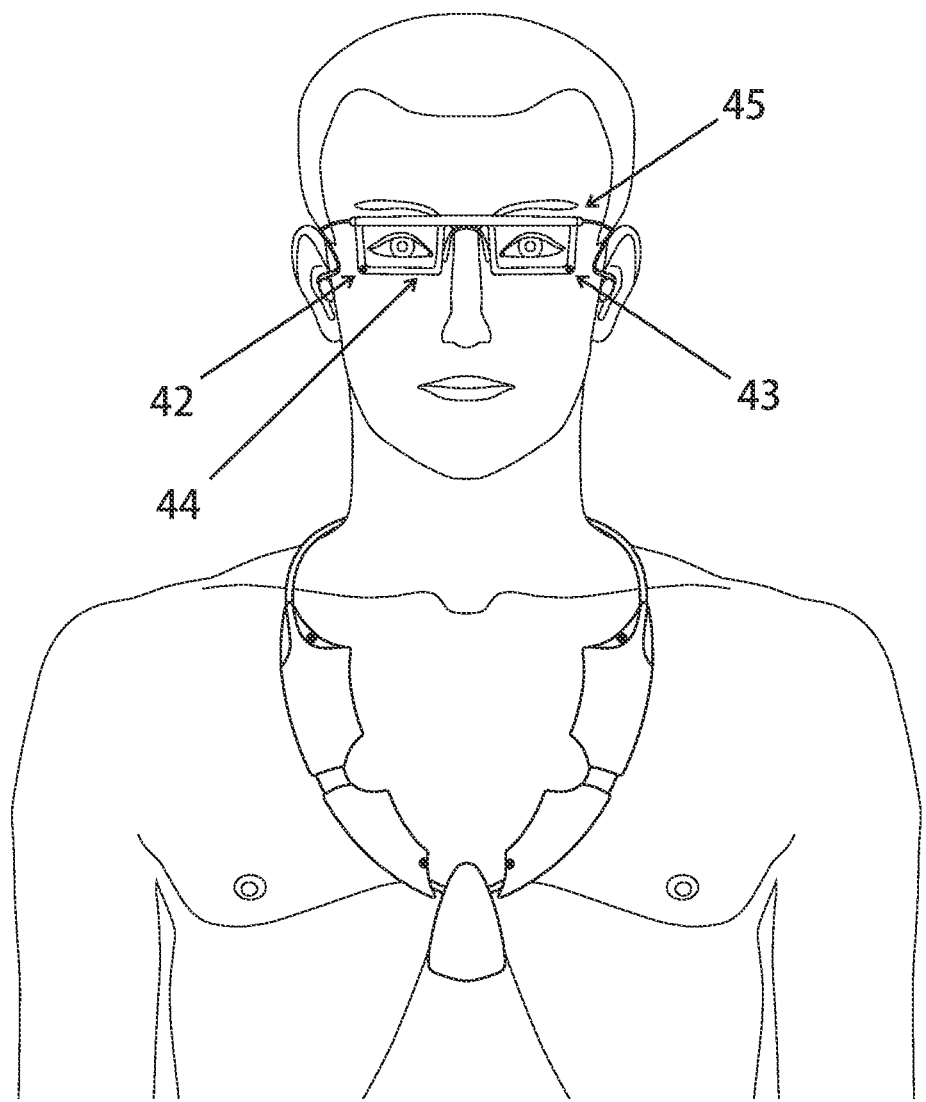
FIG. 30 illustrates possible positions of front microphones on the user's body in one embodiment of the invention comprising an additional device in a form of glasses.

FIG. 30 shows an embodiment of the invention, where two front microphones 42, 43 are located in the glasses frame 44 of an additional accessory, glasses 45. The microphones placed in the glasses are directed towards the user's mouth.

Still another approach to adaptive filter improvement is detecting silence periods in the user's speech and calculating the filter tap weights during these gaps. However, this algorithm requires a silence sensor to detect the speech gaps. An accelerometer may be used as the silence sensor, when the accelerometer is located in a portion of the device that is adjacent to the user's body surface, e.g., in the area of the temporomandibular joint. Alternatively, the earphones may comprise the silence sensor adjacent to the user's external auditory canal. Yet this method has some limitations diminishing its advantages. First, any non-intentional movement of the sensor relative to the user's body (like hiccups, yawning, chewing, etc.) results in rustles that are detected as the user's speech, and loose engagement of the sensor (e.g., due to bristle, skin roughness, skin and intra-ear secretions, etc.) causes considerable malfunction of such noise reduction systems.

Using at least two microphones, where some of them are front microphones and some are rear microphones, allows detecting the speech gaps by analyzing the signal level. When the signal level in all microphones of the array is similar (i.e., the signals are correlated), then a speech gap is detected and the filter tap weights may be adjusted, and when the signal level of the front microphone is substantially greater than the signal level of the rear microphone, then the target signal is detected and processed.

Calculation of the filter tap weights may be performed during the speech gaps, based on a projection algorithm, see [7] having high efficiency, fast convergence and relatively low calculation complexity. Further the projection algorithm is briefly discussed.

Each microphone signal spectrum can be determined based on the Fast Fourier Transform (FFT):

$$Sp(mf, mi, k) = \sum_{nt=0}^{NFTT-1} S((nt + NFTT \cdot k) \cdot \Delta T, mi) e^{-i\frac{2\pi}{NFFT}nt \cdot mi}, \quad (43)$$

$$mf \in [0, NFFT/2], \quad (44)$$
$$mi \in [0, Mic - 1],$$
$$k \in 0, 1, 2, \ldots,$$

where Sp (mf, mi, k) is the signal spectrum value for the sample number mf for the microphone number mi and for the processing cycle number k; S ((nt+NFTT×k)×ΔT, mi) is the signal value for the time count number (nt+NFTT×k) and for the microphone number mi; $\Delta T=(Fd)^{-1}$ is the sampling period in the analog-to-digital converter (ADC); Fd>2× Fmax is the sampling frequency in the ADC (Fmax is the highest target signal frequency); NFFT is the number of time counts while the signal spectrum is formed; Mic is the number of microphones in the device.

Further the signal correlation matrix is formed for NumD frequency ranges:

$$K(mi,mi1,nd,k)=\Sigma_{kf=0}^{MaxFD-1}[Sp(kf+nd\cdot MaxFD,mi,k)\cdot Sp(mf+nf\cdot MaxFD,mi1,k)^*],nd\in[0,numD-1], \quad (45),$$

where MaxFD is the number of spectral samples in a frequency sub-range; NumD=round (NFFT×(Fmax−Fmin)/ (Fd×MaxFD)) is the number of frequency sub-ranges in the operational bandwidth.

The MaxFD value is determined so as to meet the following two conditions: the narrow-band condition $$2\pi MaxFd \times Fd \times L/(NFFT \times c)<<1 \quad (46),$$

and the stable estimation of the correlation matrix condition $$MaxFD>2\times Mic \quad (47).$$

A weight factor is formed for every frequency sub-range so as to suppress the interfering noise signals:

$$\vec{C}(nd)=(I-K_f(nd)\cdot(K_f(nd)\cdot K_f(nd))^{-1}\cdot K_f(nd)\cdot \vec{S}(nd) \quad (48),$$

where I is a unitary matrix having dimension Mic; $K_f(nd)$ is the matrix composed of I columns of the correlation matrix (45); $\vec{S}(nd)$ is the reference vector having dimension Mic and providing directing the microphones to the user's mouth in the frequency sub-range nd.

The vector element for the microphone number mi is:

$$S(nd, mi) = K_{mi}e^{-i\frac{2\pi \cdot R_{mi}}{c}\left(Fmin+\frac{Fd \cdot MaxFD}{NFFT}nd\right)}, \quad (49)$$

where Rmi is the distance between the user's mouth and the microphone number mi; Kmi is sensitivity of that microphone depending on the microphone position.

The above relatively simple expression is generally not valid when diffraction occurs, as the wave front is substantially corrupted. Therefore, the above model is satisfactorily describes the signals obtained from microphones located in the area of ideal, non-distorted wave front as defined in the expression (40). However, according to experimental data, the expression (49) still may be used for low frequency signals even in diffracted area, as the sound phase is almost linearly depends on frequency (FIG. 23B).

The resulted signal spectrum is formed as follows:

$$Sp0(kf + MaxFD \cdot nd, k) = \quad (50)$$

$$\sum_{mi=0}^{Mic-1} C^*(mi) \cdot Sp(kf + MaxFD \cdot nd, mi, k),$$

$$kf \in [0, MaxFD],$$
$$nd \in [0, NumD - 1],$$

The resulted time-domain signal is formed, based on the Inverse Fourier Transform (IFT):

$$S0(nt, k) = \sum_{mf=0}^{NFFT/2} Sp(mf, k)e^{i\frac{2\pi}{NFFT}nt \cdot mf}, \quad (51)$$

$$nt \in [0, NFFT - 1],$$
$$k \in 0, 1, 2, \ldots.$$

When the process is divided into two stages as described in the above, the subtraction of the noise signal may advantageously be provided on the first stage, when the user speaks, whereas selection of the weight factors and direction vectors (see the expression (49)) may be performed on the second stage during the speech gaps, which allows substantial improving the noise reduction efficiency.

Obviously, if a microphone of the microphone array shall be positioned as a rear microphone, it is expedient to place it in a neck-worn device. The neck-worn device may be implemented as a wireless headset, a wearable electronic device, a wearable multimedia device, a wearable personal computer, a hearing aid, etc. provided in a form of a necklace or otherwise comprising a neck-wearable housing, wherein the front microphones are positioned on the user's chest, while the rear microphone or microphones may be positioned on the back surface of a helmet, a headwear piece, a shirt collar, or in a rear cord connection node of the device, which is preferable embodiment of the invention.

The neck-worn device may comprise a neck-wearable housing in any form. The neck-worn device may be based on an O-shaped loop as shown in FIG. 29B, or it may be based on a U-shaped loop (FIG. 15) comprising the same front microphones.

In this discussion, neck-wearable housing of the claimed device is mainly described as O-shaped or U-shaped loop in examples and embodiments. However, other types of neck-wearable housing may be possible.

In many embodiments the neck-wearable housing may be flexible in at least one location, for example the portions of a neck-wearable housing between dorsal node 5 and electronic unit 9 are flexible (FIGS. 15, 28). Also, the entire housing may be flexible as well.

As the position of the rear microphone is predetermined and fixed in relation to the front microphones of the wearable device, and the distance between the rear microphone and the target sound source is known as well (at least roughly), then diffraction effects occurring while sound waves pass around a human head may be considered as accountable factors, see [11].

However, positioning the rear microphone under clothes causes substantial distortion of the sound received by this microphone. This is why positioning the rear microphone in a rear cord connection node is ideal in view of providing the best possible noise reduction processing of the target signal. For example, when the rear microphone 37 is placed in the suboccipital node 6 (FIG. 25), its position is fixed in relation to the front microphones, no matter if the user's head is rotated or not, as the earphone cords adhere to the user's head by tension force and the suboccipital node moves along with the corresponding point of the back surface of the user's neck. Moreover, in this case, the rear microphone is not covered by clothes even if the neck loop itself is located under the clothes.

Alternatively, the rear microphone 38 may be placed in the dorsal node 5 (FIG. 29A). This option may be advantageous when the user has long hair or uses a headwear article (typically like female users) which may cover the suboccipitally positioned microphone and impede penetration of acoustic waves. Moreover, this option may be still advantageous even when the user has short hair or a bald head, as the rear microphone placed in the dorsal node is better protected against wind by the clothes.

Figure 31:
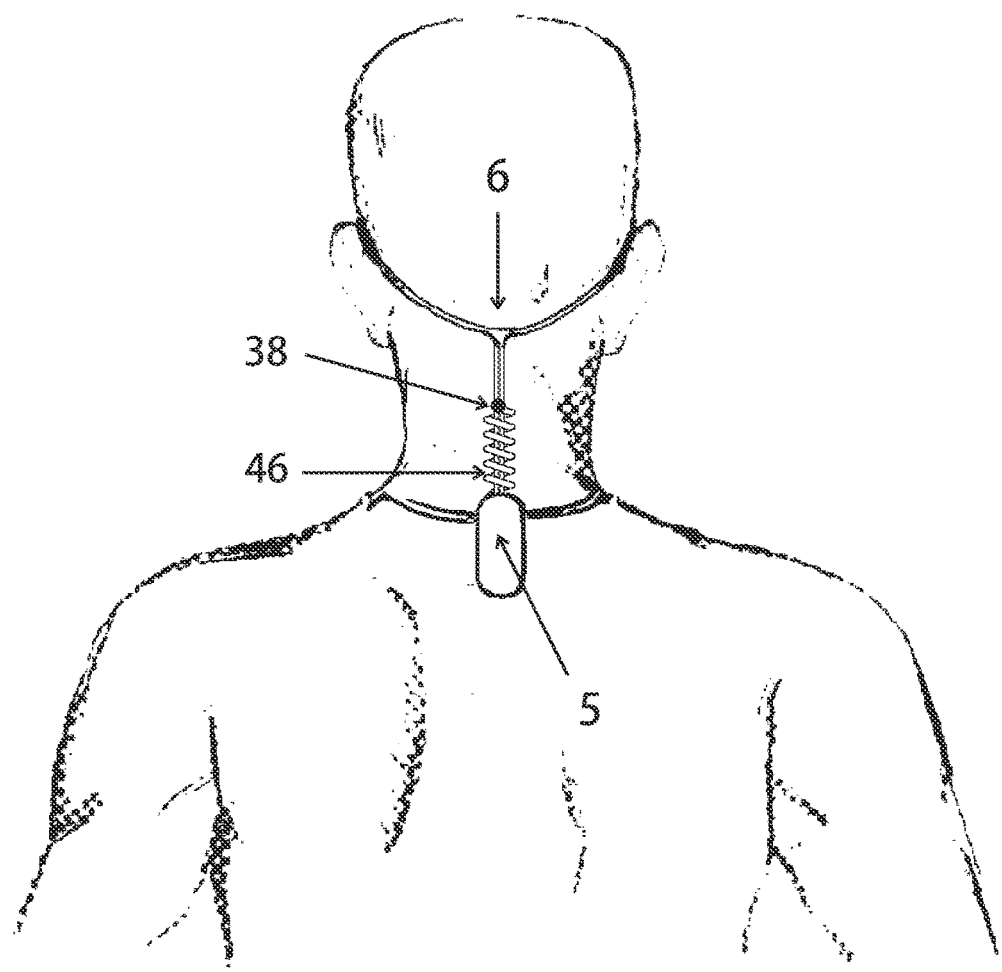
FIG. 31 illustrates possible positions of a rear microphone on the user's body in one embodiment of the invention comprising a dorsal node and a suboccipital node, when the user rotates his head

In one embodiment of the invention, the rear microphone 38 may be movably positioned between the suboccipital 6 and dorsal 5 nodes (FIG. 31), so the user is able to choose and use the best rear microphone position, depending on the operation conditions (the type of used clothes, wind, rain, acoustic environment, etc.). This option requires a separate cord for the rear microphone (like the helical cord 46 in FIG. 31), but such a feature may hardly be considered as a substantial drawback in view of the obvious advantages thereof.

Figure 32:
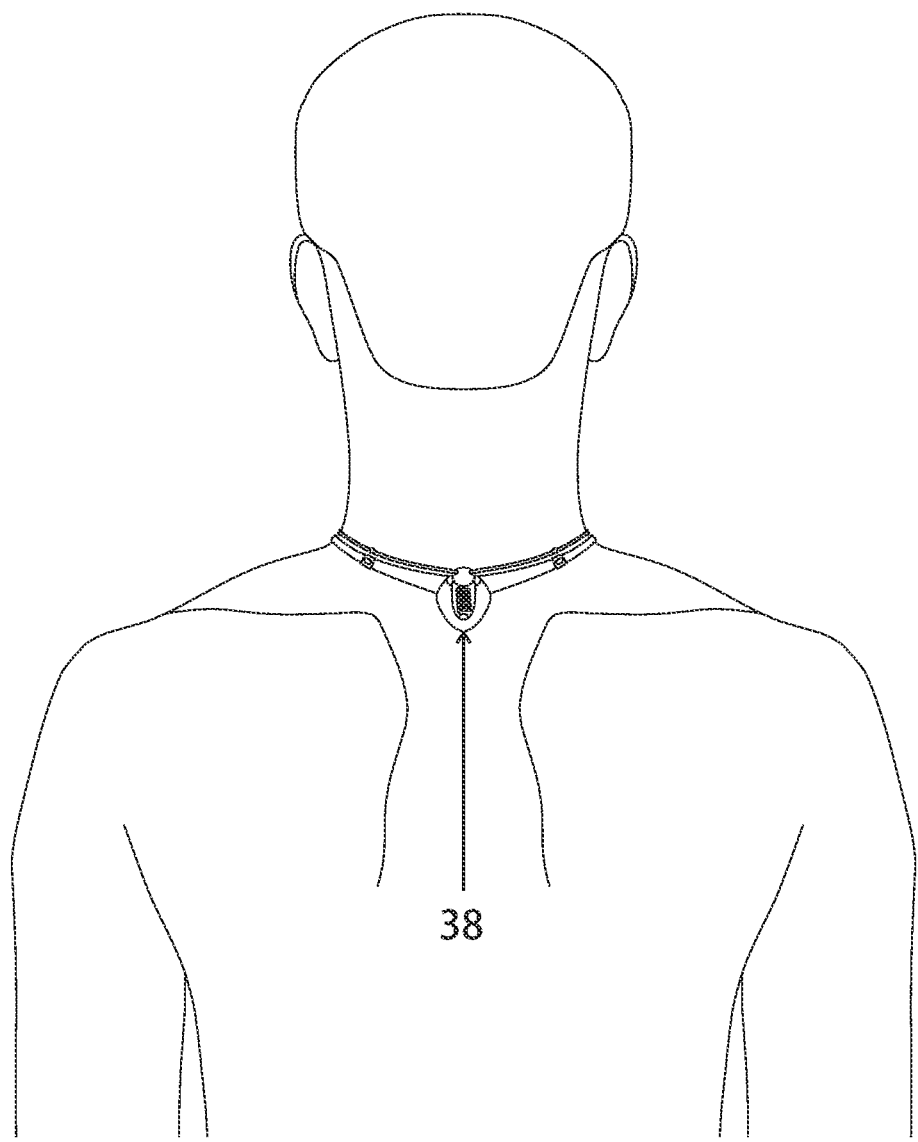
FIG. 32 illustrates position of a rear microphone on the user's body in one embodiment of the invention, when a dorsal node is retracted and attached to a suboccipital node.
Figure 33:
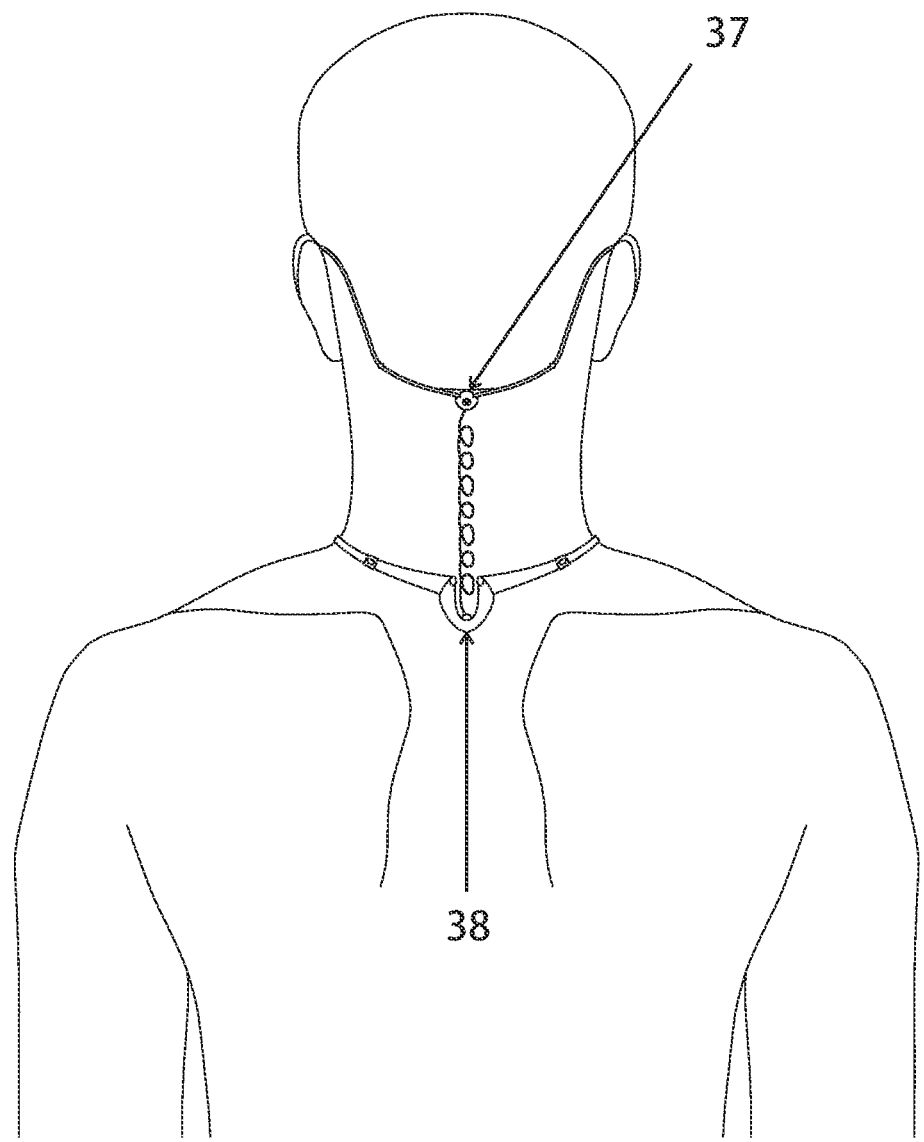
FIG. 33 illustrates position of rear microphones on the user's body in one embodiment of the invention, when a dorsal node is detached from a suboccipital node and placed on the user's dorsal surface.

In another embodiment of the invention, the rear microphone may be selected among the two rear microphones, where one of them is located in the suboccipital node and another one is located in the dorsal node, depending on the device operation conditions. For instance, when the user walks in the street, the suboccipital node position may be preferable for the rear microphone, and when the user drives a car, the dorsal node position may be preferable due to proximity of the head restraint. Sometimes, the earphones may be retracted, so the dorsal node position and the suboccipital node position may be positioned fairly close to each other. This option is illustrated by FIG. 32 and FIG. 33. The selection may be done manually by the user (e.g., via the device user interface) or automatically, based on the analysis and comparison of quality of signals of the rear microphones.

In still another embodiment of the invention, the rear microphone signal may be composed of the signals obtained from two rear microphones, e.g., using one or more of the processing algorithms described in the above.

Thus, owing to the necklace-like form-factor of the wearable device and the presence of the suboccipital and dorsal cord connection nodes, the front microphones may be positioned in the area of direct propagation of the speech sound wave, while the rear microphone (or several rear microphones) used as the noise sound wave receiver(s) may be positioned on the back surface of the user's neck in the area of the acoustic shadow for the speech sound wave. This layout pattern allows forming a correlation microphone array, wherein components of the front signal correlated with the rear signal may be treated as noise, while components of the front signal non-correlated with the rear signal may be treated as the target signal.

The first step of the signal processing includes forming a composite front signal comprising an additive mix of a noise signal and a target signal, obtained from the front microphone(s). The rear microphone(s) form(s) a rear signal comprising mainly a noise signal. Further, both signals are processed by an adaptive digital filter (e.g., a Wiener-like filter) so as to extract the target signal, using the LMS method. The system may be described by the following equations:

$$e_n = d_n - y_n \quad (52),$$

$$y_n = w_n^T x_n \quad (53)$$

where $e_n$ is the filtered target signal; $d_n$ is the combined front signal; $y_n$ is the filtered noise signal; $w_n^T$ is a transposed matrix of adaptive filter tap weights $w_n$; $x_n$ is the combined rear signal.

The adaptation principle is described as follows:

$$w_{n+1} = w_n + \mu e_n x_n \quad (54),$$

where n is the adaptation step number; $\mu$ is a positive constant defining stability and the convergence rate of the algorithm.

The correlation between the input signal $x_n$ and the output signal $d_n$, may be presented as a discrete transfer function. After successful adaptation, W(z) acceptably approximates the transfer function, so the adaptive filter may identify the system transfer function.

In the Filtered-x LMS algorithm (e.g., see [12]), P(z) is the system transfer function, P̂(z) is the system transfer function model obtained by the identification. In this case the system is described as follows:

$$e_n = d_n - P(z) y_n \quad (55),$$

where $y_n$ is the same as in the expression (53), but the expression (54) is modified in the following way:

$$w_{n+1} = w_n + \mu e_n \bar{r}_n \quad (56),$$

where $\bar{r}_n$ is a vector formed from current and previous samples of the filtered reference signal $r_n$ $$r_n = \hat{P}(z) x_n \quad (57).$$

The function P̂(z) may be presented either by a finite-impulse response (FIR) filter or an infinite-impulse response (IIR) filter; however, FIR filters are used more commonly owing to their higher stability. Identification of the function P(z) may be performed by a usual LMS algorithm. When the identifying signal is a white noise, then W(z) acceptably accurate approximates P(z). The system is considered stable if the phase error of the model does not exceed π/2. Thus, the output signal may be formed as defined in the expression (52).

In real operating conditions, the disturbance and the system response cannot be measured with ideal accuracy, so iterative methods can be used in order to maintain the algorithm convergence. This approach may be advantageous when processing non-stationary signals, though the signal duration shall exceed the disturbance duration.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

LIST OF CITED REFERENCES

1. J. Benesty, J. Chen, Y. Huang, I. Cohen, "*Noise reduction in speech processing*", Springer Science & Business Media (Apr. 28, 2009).
2. O. Hirsch, "*Bluetooth microphone array*", US 2010/0048131 A1 (2010).
3. G. C. Burnett, "*Microphone array with rear venting*", US 2009/0003640 A1 (2009).
4. A. L. Ushakov, "*Headset for a mobile electronics*", US 2014/0185821 A1 (2014).
5. Hyun Jun Park, Kwokleung Chan, "*Systems, methods, apparatus and computer program products for enhanced active noise cancellation*" US 2010/0131269 A1 (2010)
6. J. Benesty, J. Chen, Y. Huang "Microphone Array Signal Processing", Springer Topics in Signal Processing (2008).
7. Malyshkin, G. S., *Optimal and adaptive methods of processing of hydroacoustic signals*, v. 1, v. 2, St. Petersburg, "Electropribor" publishing, 2009.
8. Monsingo, R. A., Miller, T. U. *Adaptive antenna arrays. Introduction to Theory, Radio and Communications*, 1986, p. 448.
9. Sementsov et al., *Research into acoustic transfer functions and speech clarity for wearable devices*, www.necktec.ru, downloaded 22 Nov. 2015
10. Irina Aldoshina, *Bi-aural Current status of research*, http://www.show-master.ru/ Downloaded 22 Nov. 2015
11. Mayer, R. *Numerical methods of solving of edge cases or a vibrating membrane*, http://mathhelpplanet.com/ Downloaded 22 Nov. 2015
12. Asutosh Kar, A bika Prasad Chanda Sarthak Mohapatra Mahesh Chandra *An Improved Filtered-x Least-mean-square Algorithm for Acoustic Noise Suppression.*//Advanced Computing and Informatics. Proceedings of the Second International Conference on Advanced Computing, Networking and Informatics (ICACNI-2014), vol. 1 pages 25-32, Springer International Publishing (2014).

What claimed is:

1. A headset for a mobile electronic device, comprising:
    a neck-wearable housing having a generally U-shape with an electrical connector attached thereto;
    two in-ear earphones;
    two cords, each connected at one end to a corresponding in-ear earphone and connected at its other end to the electrical connector; and
    at least one noise reduction microphone array disposed on the mobile electronic device,
    wherein the two cords are mechanically connected to the neck-wearable housing, and points of connection of the cords to the neck-wearable housing are in close proximity to each other and form a dorsal cord connection node, and
    wherein the two cords are also mechanically connected to each other in sections between the in-ear earphones and the dorsal cord connection node to form a suboccipital cord connection node at the connection point.

2. The headset of claim 1, wherein the dorsal cord connection node and the suboccipital cord connection node are located on a dorsal surface of a neck, and cords in sections between the in-ear earphones and the suboccipital node are located over an auricle.

3. The headset of claim 1, wherein the suboccipital cord connection node is a clip adapted to move along the two cords for adjusting a length of the two cords.

4. The headset of claim 1, wherein the suboccipital node comprises an electrical connector for disconnecting the cords.

5. The headset of claim 1, wherein at least one of the two cords is a helical spring in a section between the suboccipital and dorsal cord connection nodes.

6. The headset of claim 1, further comprising an electronic unit mechanically and electrically coupled to the electrical connector.

7. The headset of claim 6, further comprising buttons disposed on the neck-wearable housing for control of the electronic unit.

8. The headset of claim 6, further comprising at least one power supply for the electronic unit, the power supply disposed on the neck-wearable housing.

9. The headset of claim 1, wherein the neck-wearable housing is flexible in at least one location.

10. A wearable telecommunication device, comprising:
    a neck-wearable housing with an electronic unit attached thereto;
    two in-ear earphones;
    two cords, one of which connects to one of the in-ear earphone to the electronic unit, and the other cord connects the other in-ear earphone to the electronic unit; and
    a microphone array for picking up and processing a user's voice, the microphone array comprising a front microphone, a rear microphone and a processor;
    wherein the two cords are mechanically connected to the neck-wearable housing, and points of connection of the two cords to the neck-wearable housing are close to each other and form a dorsal cord connection node, and are further mechanically connected to each other in sections between the in-ear earphones and the dorsal cord connection node to form a suboccipital cord connection node;

wherein the suboccipital cord connection node, the dorsal cord connection node, and an area of the housing close to the dorsal cord connection node form a rear portion of the wearable telecommunication device;

wherein the rear microphone is fixed on the rear portion; and wherein a front-facing portion of the neck-wearable housing is in contact with an upper chest when worn by the user.

11. The device of claim 10, wherein the rear microphone is fixed on the suboccipital cord connection node.

12. The device of claim 10, wherein the rear microphone is fixed on the neck-wearable housing close to the dorsal cord connection node.

13. The device of claim 10, wherein the rear microphone is between the suboccipital cord connection node and the dorsal cord connection node.

14. The device of claim 10, further comprising a spring between the suboccipital cord connection node and the dorsal cord connection node.

15. The device of claim 14, wherein the rear microphone is fixed on the spring.

16. The device of claim 10, wherein the rear microphone detects surrounding noise, and wherein a correlated portion of the signal from the rear microphone and the signal from the front microphone represents noise, while an uncorrelated portion of the signal represents a useful data.

17. The device of claim 16, wherein signals from the rear microphone and the front microphone are ignored when their correlation is above a pre-defined threshold.

18. The device of claim 10, wherein the front microphone is fixed on the front-facing portion of the neck-wearable housing.

19. The device of claim 10, wherein the microphone array includes at least two front microphones, wherein the two front microphones are fixed on the front-facing portion of neck-wearable housing at a substantially the same height when worn by the user and one of the at least two front microphones is close to or below a right clavicle of the user, and the other of the at least two front microphones is close to or below a left clavicle of the user.

20. The device of claim 10, further comprising at least one gradient microphone array comprising at least two front microphones fixed on the front-facing portion of the neck-wearable housing at different heights when worn by the user, wherein the gradient microphone array is used to determine a directional diagram of received sound waves.

21. The device of claim 10, further comprising at least one phased microphone array comprising at least two front microphones fixed on the front-facing portion of the neck-wearable housing at different heights when worn by the user, wherein the phased microphone array is used to determine a directional diagram of received sound waves.

22. The device of claim 10, further comprising an electronic accessory in a form of a wrist watch, which is wirelessly connected to the electronic unit, wherein the electronic accessory includes the front microphone.

23. The device of claim 10, further comprising an electronic accessory in a form of a finger ring, which is wirelessly connected to the electronic unit, wherein the electronic accessory includes the front microphone.

24. The device of claim 10, further comprising an electronic accessory in a form of eyeglasses, which is connected to the electronic unit, wherein the electronic accessory includes the front microphone.

25. The device of claim 10, wherein the neck-wearable housing is generally U-shaped.

26. The device of claim 10, wherein the neck-wearable housing is generally O-shaped.

27. The device of claim 10, wherein the neck-wearable housing is flexible in at least one location.

28. A wearable telecommunication device, comprising:

a neck-wearable housing configured to be mounted on a human body and in contact with back, left, right sides of the neck and upper chest and having at least one electronic unit attached thereto;

two in-ear earphones, two cords, one of which connects to one of the in-ear earphone to the electronic unit, and the other cord connects the other in-ear earphone to the electronic unit, a microphone array for picking up and processing a user's voice, comprising a front microphone, a rear microphone and processor;

wherein the two cords are mechanically connected to the neck-wearable housing and points of connection of the two cords to the neck-wearable housing are close to each other and form a dorsal cord connection node, and are further mechanically connected to each other in sections between the in-ear earphones and the dorsal cord connection node to form a suboccipital cord connection node at the connection point;

wherein the rear microphone is on a portion of the neck-wearable housing configured to be in contact with a back of the neck when worn by the user; and wherein a correlated portion of the signal from the rear microphone and the signal from the front microphones represents noise, while an uncorrelated portion of the signal represents useful data.

29. The device of claim 28, wherein the rear microphone is fixed on any of (i) the suboccipital cord connection node, (ii) the neck-wearable housing close to the dorsal cord connection node, and (iii) between the suboccipital cord connection node and the dorsal cord connection node.

30. The device of claim 28, further comprising a spring between the suboccipital cord connection node and the dorsal cord connection node, wherein the rear microphone is on the spring.

31. The device of claim 28, wherein the front microphone is fixed on a portion of the neck-wearable housing that is in contact with the user's chest when worn by the user.

32. The device of claim 28, wherein signals from the rear microphone and the front microphone are ignored when their correlation is above a pre-defined threshold.

33. The device of claim 28, wherein the device forms an output signal $e_n$ as:

$$e_n = d_n - y_n, \text{ where}$$

$y_n$ is a correlated signal representing filtered noise calculated as:

$$y_n = w_n^T x_n, \text{ where}$$

$x_n$ is a combined signal from the rear microphone, $d_n$ is a combined signal from the front microphones, $w_n$ are adaptive filter coefficients defined as:

$$w_{n+1} = w_n + \mu e_n x_n, \text{ where}$$

$w_{n+1}$ is a set of coefficients at a current moment of time n+1, $w_n$ is a set of coefficients at a previous moment of time, n is defined by a clock rate of the incoming data stream, μ is a positive value defining stability and convergence rate.

34. The device of claim 28, wherein the device forms an output signal $e_n$ based on a Filtered-X Least-Mean-Square (FXLMS) algorithm:

$e_n = d_n - P(z)y_n$, where $d_n$ is a combined signal from the front microphones, P(z) is a transfer function, and $y_n$ is a correlation signal defined by:

$y_n = w_n^T x_n$, where $x_n$ is a combined signal from the rear microphone, $w_n$ are adaptive filter coefficients defined as:

$w_{n+1} = w_n + \mu e_n \bar{r}_n$, where $w_{n+1}$ is a set of coefficients at a current moment of time n+1, $w_n$ is a set of coefficients at a previous moment of time n, n is defined by a clock rate of the incoming data stream, μ is a positive value defining stability and convergence rate, $\bar{r}_n$ is a vector formed by current and previous values of a filtered base signal $r_n$ according to:

$r_n = \hat{P}(z)x_n$, where $\hat{P}(z)$ is based on a Least Mean Squares Algorithm that corresponds to a finite impulse response (FIR) filter.

35. The device of claim 28, wherein the microphone array includes two front microphones,
wherein the two front microphones are fixed on a portion of the neck-wearable housing that is in contact with the user's chest and at a substantially the same height when worn by the user and one of the two front microphones is close to or below a right clavicle of the user, and the other of the two front microphones is close to or below a left clavicle of the user.

36. The device of claim 28, further comprising at least one gradient microphone array comprising at least two front microphones fixed on the front-facing portion of the neck-wearable housing at different heights when worn by the user, wherein the gradient microphone array is used to determine a directional diagram of received sound waves.

37. The device of claim 28, further comprising at least one phased microphone array comprising at least two front microphones fixed on the front-facing portion of the neck-wearable housing at different heights when worn by the user, wherein the phased microphone array is used to determine a directional diagram of received sound waves.

38. The device of claim 28, wherein the rear microphone is used as a detector of surrounding noise wherein a correlated portion of the signal from the rear microphone and the signal from the front microphone represents noise, while an uncorrelated portion of the signal represents a useful data.

39. The device of claim 28, wherein signals from the rear microphone and the front microphone are not transmitted when their correlation is above a pre-defined threshold.

40. The device of claim 28, wherein the neck-wearable housing generally is U-shaped.

41. The device of claim 28, wherein the neck-wearable housing generally is O-shaped.

42. The device of claim 28, wherein the neck-wearable housing is flexible in at least one location.

43. A wearable telecommunication device, comprising:
a flexible neck-worn sheath with at least one electronic unit attached thereto;
two in-ear earphones;
two cords, one of which connects to one of the in-ear earphone to the electronic unit, and the other cord connects the other in-ear earphone to the electronic unit,
wherein the two cords are mechanically connected to the neck-worn sheath, and points of connection of the two cords to the neck-worn sheath are close to each other and form a dorsal cord connection node, and are further mechanically connected to each other in sections between the in-ear earphones and the dorsal cord connection node to form a suboccipital cord connection node at the connection point; and
a rear microphone in the suboccipital cord connection node or in the dorsal cord connection node.

* * * * *